United States Patent
Lowe et al.

(10) Patent No.: US 12,309,441 B1
(45) Date of Patent: May 20, 2025

(54) REBALANCING ARCHITECTURE FOR VIDEO STREAMING EVENT COMMUNICATION

(71) Applicant: Amazon Technologies, Inc., Seattle, WA (US)

(72) Inventors: Richard William Lowe, Royston (GB); Adam Kalinowski, Kobylin-Borzymy (PL); Piotr Jacek Sykulski, Warsaw (PL)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 78 days.

(21) Appl. No.: 18/370,202

(22) Filed: Sep. 19, 2023

(51) Int. Cl.
*H04N 21/24* (2011.01)
*H04N 21/61* (2011.01)

(52) U.S. Cl.
CPC ..... *H04N 21/2405* (2013.01); *H04N 21/6125* (2013.01)

(58) Field of Classification Search
CPC .......... H04N 21/2405; H04N 21/6125; G02B 27/0977; G06F 11/3072; G06F 16/254; G06F 3/067; G06Q 50/06; H04L 9/3213
See application file for complete search history.

(56) References Cited

U.S. PATENT DOCUMENTS

| | | | |
|---|---|---|---|
| 2018/0189367 A1* | 7/2018 | Theimer | G06F 16/254 |
| 2021/0144517 A1* | 5/2021 | Guim Bernat | H04L 9/3213 |
| 2022/0164109 A1* | 5/2022 | Hankins | G06F 3/067 |
| 2023/0152598 A1* | 5/2023 | Brebner | G02B 27/0977 |
| | | | 359/627 |
| 2024/0119386 A1* | 4/2024 | Kearns | G06Q 50/06 |
| 2024/0420274 A1* | 12/2024 | Chaudhari | G06F 11/3072 |

* cited by examiner

*Primary Examiner* — Le H Luu

(74) *Attorney, Agent, or Firm* — K&L Gates LLP

(57) ABSTRACT

Systems and techniques are described for rebalancing a video event streaming bus are generally described. In various examples, a first set of unassigned partitions of an asynchronous event driven messaging architecture are determined. The first set of unassigned partitions of the asynchronous event driven messaging architecture may relate to detected events associated with recorded video. A first set of server instances with no assigned partitions may be determined. A single partition of the first set of unassigned partitions may be assigned to each server instance of the first set of server instances.

20 Claims, 9 Drawing Sheets

REBALANCING ARCHITECTURE FOR VIDEO STREAMING EVENT COMMUNICATION

BACKGROUND

Security systems may use one or more cameras to capture video data of areas of interest. For example, video security cameras may be positioned so as to surveil an entryway into a secure area such as a bank vault or an entrance to a private residence. Security camera systems sometimes use motion detection to initiate video capture and/or video streaming to one or more other devices. For example, upon detection of motion in video data, a camera may be configured to capture and send a live feed of video from the camera to a cloud-based server system, a central computing device, and/or to a mobile application executing on a mobile phone. In other examples, upon detection of motion in video data, a camera may begin storing captured video data in a data storage repository.

DETAILED DESCRIPTION

Figure 1A:
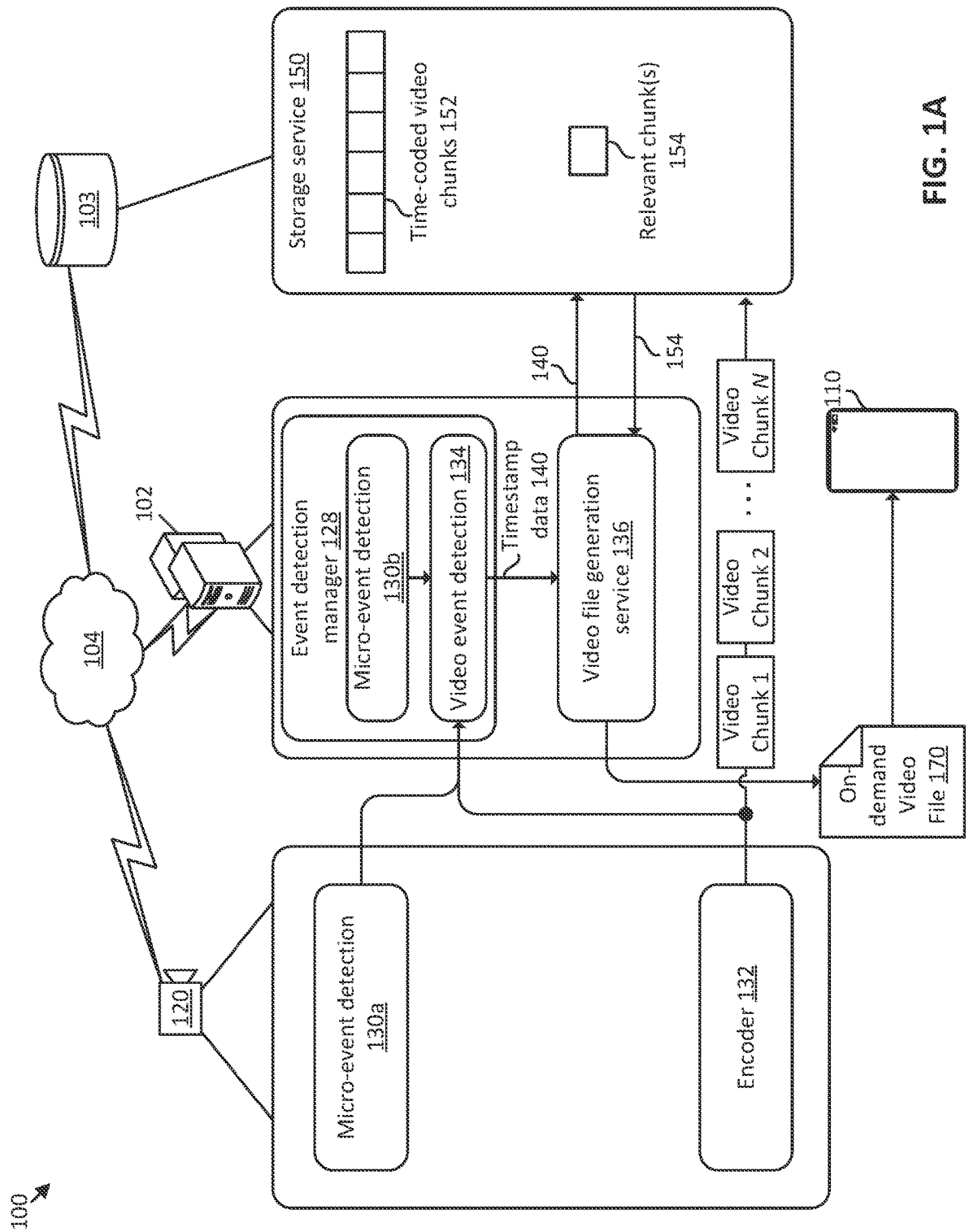
FIG. 1A is a diagram illustrating an example system for continuous video recording, storage, and on-demand event streaming, in accordance with various aspects of the present disclosure.

In the following description, reference is made to the accompanying drawings which illustrate several embodiments of the present invention. It is understood that other embodiments may be utilized and mechanical, compositional, structural, electrical operational changes may be made without departing from the spirit and scope of the present disclosure. The following detailed description is not to be taken in a limiting sense, and the scope of the embodiments of the present invention is defined only by the claims of the issued patent.

In various examples, a location such as an office building, home, outdoor space, and/or any other physical location or combination of physical locations may be monitored by one or more camera devices, e.g. camera devices of a security system or other type of camera system. In various examples, camera devices may be battery-powered and/or solar powered for ease of installation and to avoid unsightly power cords. In various other examples, camera devices may be powered through a wired interface (e.g., powered from "mains" power from a wall socket or wire(s)).

In some network-connected camera devices, motion and/or other events may be used to trigger capture and/or streaming of video (e.g., to a back-end server and/or a mobile device). For example, camera devices may include motion sensors to detect motion. Camera devices may be operated in a low power state (sometimes referred to as "sleep" mode) prior to detection of motion. In some examples, during the low power state, the camera may capture and store a limited amount of video in a rolling buffer—with the oldest portions of the video in the rolling buffer being deleted as video from the current time is stored. When motion is detected the camera device may begin encoding and/or streaming video to one or more other systems and/or devices (e.g., a remote video processing system and/or device) for storage, display, and/or processing. For example, the contents of the rolling buffer may be encoded and sent to a remote system followed by a stream of video captured by the camera while motion is detected. Waiting until motion is detected prior to capturing and/or streaming image data and/or video data may prolong battery life (and minimize power consumption) by capturing, encoding, and/or streaming video only when movement is detected. In many cases, and particularly in a surveillance context, video segments that do not depict movement and/or which represent trivial movement (e.g., leaves blowing in the wind) may not be of sufficient interest to a user of the camera system to warrant continuous video capture and/or streaming, particularly given that transmission of video data results in a quicker consumption of battery power and more frequent battery replacement. In various examples, video data may refer to one or more sequential frames of image data (e.g., image data encoded in accordance with H.264, H.265, etc.). In such motion-triggered video streaming architectures, video data that is streamed to the cloud as a result of a motion event (or other trigger) may be stored in association with data representing a triggering event (e.g., data representing detected motion, an object detection, a doorbell button press, etc.). Data representing triggering events may also be provided to a companion application. A user may select a respective event using a user interface of the companion application to initiate streaming of the captured video associated with that respective triggering event.

An architecture in which all video data is stored in association with a corresponding triggering event may not be suitable for camera architectures employing continuous recording and/or streaming of video data (e.g., 24 hours per day, 7 days per week). This is because, unlike the triggered streaming described above, continuous streaming video is not directly associated with triggering events (even though events-of-interest may occur during the continuous stream). Described herein is a time-based architecture that can be used to associate a stream of detected video events (events that may be of interest to a user of the camera device) with the appropriate portions of a continuous video stream. In various examples described herein, video (and image) data is stored distinctly from data representing various events (and/or micro-events that make up larger, pre-defined video events). Additionally, in various examples, an independent event detection system may be deployed that is separate from a storage system that stores continuously-recorded video.

In various examples, the number of video events (and/or micro-events making up a larger video event) being detected and processed by the various computing systems described herein may be highly variable. For example, motion detection micro-events, human detection micro-events, initiation of live streaming micro-events, doorbell button presses, and/or various other micro-events may be much more prevalent during daylight hours and/or at certain times of day (e.g., during business hours). As such, an event streaming architecture that is used to send data concerning such events to various systems (as discussed in further detail below) may use a variable amount of compute resources at any given point in time. Described herein are rebalancing architectures that may be used for such a continuous video event streaming bus that uses an asynchronous event-driven messaging architecture (such as Apache Kafka).

Representational State Transfer (REST) APIs use the synchronous paradigm of communication, where a request is made and a response is waited for before making a new request. For example, in the context of the Internet, a uniform resource locator (URL) is entered into a browser interface, which sends a request to the server. The server sends the response with the content of the website. Accordingly, the web is an example implementation of a REST API. REST API calls are often referred to as "synchronous" API calls indicating that code execution and user interaction is stopped until the call returns the requested information. In some other scenarios other operations may be asynchronous, as code execution and/or user interaction need not stop to wait for the response. Event-driven architectures (EDAs) employ asynchronous communication. In EDAs, data (usually referred to as messages) are sent by a "publisher" (an entity generating the data) to a message broker. The message broker may be infrastructure that stores the message and delivers the message to "subscribers" (applications that have registered to receive the particular message from the particular publisher).

EDAs typically employ infrastructure called a "message broker" that receives messages (data) from publishers and delivers the messages to subscribers that have registered to receive such messages. Examples of message brokers include RabbitMQ, Apache Kafka, JBoss Messaging, Solace, etc. Accordingly, publishers may be data generating software/hardware that sends messages to the message broker. In the examples discussed herein, such an EDA may be used for communicating verified micro-events detected in video to a downstream processing system. Each type of video micro-event may be associated with a particular topic within the EDA. The processing load (e.g., micro-event messages) of such topics may be split into partitions. A certain number of partitions may be dynamically assigned/re-assigned between server instances (e.g., compute nodes that are deployed in order to handle the current event traffic) depending on the traffic load. Due to the variability in traffic, server instances may be deployed and deprovisioned based on the current amount of traffic with a goal of providing low-latency micro-event notification (e.g., <50 ms or some other desired service level agreement). Accordingly, in order to ensure efficient use of the server instances, partitions may be dynamically reassigned (a process referred to herein as "rebalancing") to ensure that server instances are neither overloaded nor under-loaded.

In some rebalancing architectures used by EDAs, a server instance that is overloaded with partitions may have many partitions unassigned at once, with the now unassigned partitions being assigned to other server instances, based on server partition load. Such a rebalancing approach limits the frequency at which rebalancing needs to occur. However, while the rebalancing is on-going, the messages associated with each partition that is stopped/unassigned may not be processed during the time period in which the stopped partition is unassigned from the overloaded server instance until the partition is re-assigned to another server instance. In the context of continuous video streaming and recording (such as in home security and other contexts), this may result in potentially important events (e.g., a potential intruder, accident, package delivery, etc.) being missed while partitions are rebalanced among server instances. Accordingly, the various systems and techniques discussed herein may be used to unassign no more than a single partition at a time, per-topic, during rebalancing. In this way, the number of missed micro-events may be kept to a minimum, while still preserving low-latency micro-event streaming and efficient server instance utilization.

Various other technical challenges may arise in a continuous video recording architecture where event detection is logically separated from video recording. For example, the storage service that stores video data may store the data in video "chunks" of a static or variable size. However, a video event of interest may not correspond exactly to the boundaries of these chunks. For example, a single video event may span multiple chunks or a single chunk may include multiple video events of interest. In at least some examples, an application programming interface (API) of the storage service may not support generation, streaming, and/or downloading of files that represent portions of chunks or combinations of different chunks. Additionally, a given video event may not commence at a time that corresponds with an intra-encoded frame of video that can be individually decoded without reference to any other frame of video. The foregoing examples are merely some of the technical challenges that may arise when implementing a continuous video recording architecture that stores video independently from event data that describes detected events associated with the video. Other example challenges and/or techniques are described in further detail below. In addition, it should be noted that the various systems and techniques discussed herein may also be used in contexts in which video recording/streaming is non-continuous. In various examples, some camera devices may be configurable to switch between continuous and non-continuous recording/streaming modes.

While detection of motion may or may not be used to trigger streaming of video data from a camera device, the detection of motion may still signify a video event and/or micro-event that may be of interest to a user. Accordingly, camera devices described herein may employ motion detection systems whether or not such cameras are used for continuous or non-continuous recording/streaming. Additionally, in various examples, camera devices may be used in either continuous or non-continuous recording/streaming modes. For example, a companion application associated with a camera device may be used to configure the camera device to record and/or stream in continuous or non-continuous recording/streaming modes (among other possible configurations).

In some examples, motion may trigger a motion sensor of a camera device, which may, in turn, cause the camera device to detect a micro-event or video event. As used herein, a "video event" may refer to an event which may be of interest to a user and an event for which a video playback file may be generated that a user may view and/or delete. As used herein, a "micro-event" may refer to individual detected actions or sub-events which may make up a video event. As described in further detail below, a set of micro-events may be detected and may be determined to correspond to a particular video event. Such micro-events may be deemed "verified" micro-events. For example, a motion detection micro-event, followed by a doorbell button press micro-event, followed by a live video stream initiation micro-event, followed by a cessation of live video streaming micro-event may comprise a "Doorbell Button Press/Answer" video event. In various examples, a companion application associated with a camera device may receive notifications related to detection of verified video events. In this context, a verified video event may be an event made up of a set of predetermined micro-events. In some examples, a user may select the types of video events for which they would like to receive notifications in the companion application. Similarly, in some instances, a user may select the types of video events that they would like to ignore and/or have notifications suppressed. For example, a user may configure the settings of the system to provide notifications for doorbell press video events (e.g., push notifications), while suppressing push notifications for motion events during specified hours (e.g., between 8-9 am on weekdays). In some cases, even if a notification for a particular video event is suppressed, the user may still be able to select the video event in the companion application and initiate on-demand video file generation and/or playback, as described herein.

The micro-events may be streamed using an EDA, as previously described, to a service that may determine whether a set of micro-events corresponds to a video event. Upon detection of a video event, the service (described in further detail below as video event detection 134) may send a notification to the companion application associated with the relevant camera device(s).

In various examples, camera devices may include and/or be configured in communication with passive infrared (PIR) sensors effective to detect motion in an environment monitored by the PIR sensor and/or by the camera devices. PIR sensors detect infrared (IR) radiation emitted by objects within the PIR sensors' fields-of-view. In some examples, the PIR sensors may be referred to herein as "PIR motion detectors" and "PIR motion sensors". In various examples, a PIR sensor may be effective to determine when an object passes through a PIR sensor's field-of-view by determining differential changes in the IR detected by the PIR sensor.

A passive infrared sensor may comprise two pyroelectric sensing elements electrically coupled together with opposite polarization to produce an output. In this way, an equal change in temperature at both of the pyroelectric sensing elements will cancel out in the output signal, thus filtering out temperature changes in the environment. However, a change in temperature at only one of the pyroelectric sensing elements will result in an output signal that is positive or negative (depending on which pyroelectric sensing element experienced the change in temperature).

A passive infrared sensor may include two slots, each providing an optical path to one of the pyroelectric sensing elements. A passive infrared sensor may comprise one or more lenses configured to direct light received at the one or more lenses onto one of the pyroelectric sensing elements. A passive infrared sensor may include one or more lenses configured to direct light received at a first portion of the one or more lenses (e.g. a left portion) onto a first of the pyroelectric sensing elements (e.g. a left sensing element), and to direct light received at a second portion of the one or more lenses (e.g. a right portion) onto a second of the pyroelectric sensing elements (e.g. a right sensing element). The one or more lenses may comprise one or more Fresnel lenses having one or more features configured to direct light.

A passive infrared sensor may be analog, with an analog signal output, or may be digital, with digital data output generated utilizing an analog-to-digital converter (ADC) (e.g., output from the ADC or output generated based on output from the ADC).

An electronic device may include one or more passive infrared sensors that the electronic device uses to detect motion of objects. Each passive infrared sensor may output a signal or sensor data, and the electronic device may use the signal or a characteristic determined using the signal or sensor data to determine whether the passive infrared sensor detected an object. The characteristic may include a voltage represented by the signal or sensor data, an amplitude of a wave generated or determined using the signal or sensor data, an angle of the wave generated using the signal or sensor data, and/or the like.

In accordance with one or more preferred implementations, a PIR sensor includes an integrated circuit (IC) component that receives voltage inputs from one or more lines coupled to a first PIR sensing element and a second PIR sensing element. In accordance with one or more preferred implementations, the IC component receives an input from each sensing element, while in accordance with one or more preferred implementations, the IC component receives a summed voltage.

In accordance with one or more preferred implementations, the IC component determines whether a summed voltage exceeds a first threshold, and, if so, sends a logic signal (e.g. a Boolean value or an interrupt) to a controller (e.g. a microcontroller unit or MCU) of an electronic device. Based on the received logic signal, the controller begins periodically polling or requesting PIR data (e.g. a most recent data value at the time of polling) from the IC component. For example, the controller may poll the IC component at a rate of 64 Hz. In accordance with one or more preferred implementations, the logic signal represents an interrupt that triggers additional processing based on radar data and PIR data as described herein.

However, the triggering of a PIR sensor (e.g., a PIR sensor detecting a motion micro-event or video event) may rely on tunable thresholds (e.g., a threshold magnitude of differential change between the halves of a PIR sensor). If such thresholds are set too high, motion events of interest may be missed without the camera being triggered. Conversely, if such thresholds are set too low, insignificant motion events (e.g., leaves blowing in the wind, raindrops, etc.) may cause the camera device to be triggered, resulting in detection and/or notification of video events that are unlikely to be of interest to the user and potentially causing information fatigue (where the user is unlikely to pay attention to video feeds from the camera due to a large number of false positives).

Additionally, PIR sensors may have difficulties distinguishing between motion that is likely to be of interest to a user and motion that is relatively inconsequential and unlikely to be of interest to a user. For example, an outdoor PIR may trigger based on sunlight that is filtered through a tree as the wind blows the leaves of the tree and different amounts of radiation are detected by different regions and/or halves of the PIR sensor. Additionally, in scenarios where the target objects to be detected are people at relatively short distances (e.g., a PIR sensor in a video-enabled doorbell camera), large, non-target objects at greater distances, like cars passing on a street, can cause false triggering of the PIR sensor. Additionally, PIR sensors often have difficulty detecting motion when the motion is directly toward or away from the PIR sensor, as the radiation from such objects may not pass between different sensor halves and/or sensor regions and thus may not trigger the PIR sensor. To account for this difficulty, the sensitivity of the PIR sensor may be increased, which in turn, may lead to increased false triggering due to distant non-target motion.

To help eliminate false triggering in PIR motion-sensing systems that are not highly power constrained, a secondary form of motion sensing may be used to corroborate motion by the PIR sensor, individually detect micro-events or video events, etc. For example, secondary radio frequency (RF) motion detectors and video analytics in camera systems (e.g., using a machine learning model) may be used to corroborate detection of motion by a PIR sensor.

A radar sensor may use a frequency modulated continuous wave (FMCW) approach where a set of one or more frequency modulated chirps and transmitted, and the returning signals are utilized to determine distances to detected objects.

In accordance with one or more preferred implementations, a received signal is mixed with a transmitted signal (e.g. transmitted using an antenna). The received signal represents a reflection of the transmitted signal that has been received after it has reflected off of surfaces and/or objects within the environment (e.g., an environment being monitored by the radar sensor) to generate an intermediate frequency (IF) signal. The transmitted and received signals may be mixed to determine a difference between the instantaneous frequencies of each of the transmitted and received signals at that time t. This Doppler frequency may be used to detect movement along with velocity. Additionally, depending on if the transceiver is fed with a continuous wave (CW) Doppler or frequency modulated CW (FMCW), other parameters of an object can be determined such as distance to the sensor. Additionally, given an additional antenna, the position or coordinates of the object can be triangulated.

In some examples, the output data of a PIR sensor and a radar sensor may be fused and are input into a machine learning model (e.g., a supervised machine learning model, unsupervised machine learning model, etc.) that may be used to determine whether motion is detected in the monitored environment and/or whether a micro-event or video event has occurred. The machine learning model may be trained using annotated training data that provides examples of positive motion events and negative motion events (together with the attending PIR and radar data). Accordingly, the machine learning model may learn common false positive and false negative scenarios and may thereby provide more accurate and useful motion detection.

Machine learning techniques, such as those described herein, are often used to form predictions, solve problems, recognize objects in image data for classification, etc. In various examples, machine learning models may perform better than rule-based systems and may be more adaptable as machine learning models may be improved over time by retraining the models as more and more data becomes available. Accordingly, machine learning techniques are often adaptive to changing conditions. Deep learning algorithms, such as neural networks, are often used to detect patterns in data and/or perform tasks.

Generally, in machine learned models, such as neural networks, parameters control activations in neurons (or nodes) within layers of the machine learned models. The weighted sum of activations of each neuron in a preceding layer may be input to an activation function (e.g., a sigmoid function, a rectified linear units (ReLu) function, etc.). The result determines the activation of a neuron in a subsequent layer. In addition, a bias value can be used to shift the output of the activation function to the left or right on the x-axis and thus may bias a neuron toward activation.

To train a machine learning model a cost or "loss" function may be utilized that describes the difference between expected output of the machine learning model and actual output. Parameters (e.g., weights and/or biases) of a machine learning model may be updated based on annotated training data to minimize (or maximize) the cost. For example, the machine learning model may use a gradient descent (or ascent) algorithm to incrementally adjust the weights to cause the most rapid decrease (or increase) to the output of the loss function. The method of updating the parameters of the machine learning model is often referred to as back propagation.

A video may be represented by a number of video frames that may be displayed in sequence during playback, with each video frame being comprised of rows and columns of pixels arranged in a two-dimensional grid. The resolution of a particular video frame is described by the width of the frame, in terms of a first number of pixels, by the height of the frame, in terms of a second number of pixels. Video frames may be compressed using different picture types or frame types, such as intra-coded pictures or frames, predicted pictures or frames, and/or bi-predictive pictures or frames. Generally, the term "frame" is used to refer to an entire image captured during a time interval (e.g., all rows and columns of pixels comprising a particular image). Generally, the term "field" is used to refer to part of a frame, e.g. either the odd-numbered or even-numbered scanning lines of the frame. Generally, the term "picture" is used to refer to either a frame or a field. For simplicity, in some cases, various techniques described herein may be described in reference to "frames" or "pictures" even though actual operations may be performed on pixels and/or groups of pixels (e.g., on frame data or picture data).

It will be appreciated that, generally, the amount of data required to represent a video frame will increase as the resolution of the video frame increases (given a relatively constant frame rate), and as the frame rate increases (given a relatively constant resolution). It will be appreciated that given the amount of data required to represent a frame, videos recorded at even a moderate resolution and frame rate will quickly begin to require a very large amount of data for representation. This is especially problematic for video streaming, as most networks have bandwidth limitations.

To ameliorate this, video data is frequently compressed to reduce the amount of data necessary to represent a given length of video at a given resolution. This compression is generally characterized as encoding video data.

So-called lossy compression typically refers to intra-frame compression where the amount of data used to represent a given picture is reduced relative to a raw or native format of the picture. One common example of intra-frame compression uses a frequency domain-based image transform such as a discrete cosine transform (DCT), a Fourier transform, a Hadamard transform, an integer transform, etc., to represent the image data in the frequency domain.

In DCT, coefficients of different frequency cosine waves are calculated based on the contribution of the different frequency cosine waves to the portion of the image being encoded. After subjecting image data to a DCT, the lower frequency cosine wave coefficients are typically much larger relative to the higher frequency cosine wave coefficients.

This is due to the higher frequency cosine waves typically having a less significant impact (i.e., the higher frequency cosine waves contribute less to the image or portion of the image) on the image being encoded and the lower frequency cosine waves having a more significant impact on the image being encoded. The coefficients of the different frequency cosine waves may be divided by quantization factors during a quantization process and rounded to the nearest integer, to further compress the data. In various examples, the quantization factors may be determined using a rate control algorithm. A rate control algorithm may solve an optimization problem to determine the number of bits that should be used to encode macroblocks (two-dimensional groupings of contiguous pixels in the picture) of image data and/or a frame of image data at a given level of image quality and/or at a given level of distortion. In some other examples, a rate control algorithm may solve an optimization problem to determine a level of image quality at a given number of bits. Image quality may be determined using peak signal to noise ratio (PSNR) and/or structural similarity index (SSIM), for example.

After quantization, several zero value coefficients are typically present in the high frequency cosine wave range of the compressed image data. The list of quantized coefficients can be serialized using, for example, a "zig zag" scan of the array of quantized coefficients. The serialized list of quantized coefficients can be further compressed using an entropy encoding process, such as binary arithmetic encoding or Huffman encoding, to reduce the number of bits necessary to represent the compressed image data.

Reference frames are frames of a compressed video that are used to define other frames and come in various types. A compressed video may comprise one or more frames that do not include all of the pixel data within the frames themselves, but rather reference pixel values of other frames (e.g., reference frames). Intra-coded frames ("I-frames") include detailed pixel data in order to be self-decodable and to provide reference pixel values for other inter-coded frames. As a result, I-frames do not require other video frames in order to be decoded, but provide the lowest amount of data compression.

An encoding approach can encode a frame as an intra-coded frame, or encode a picture as an intra-coded picture. Regions other than a frame or field can be defined and utilized for encoding as well. For example, an encoding approach can utilize a "slice" representing a defined region of a frame or picture that is encoded separately from any other region. In an approach utilizing slices or other portions, such as H.264, a frame or picture can be characterized as intra-coded if all of the slices or portions making up the frame or picture are intra-coded.

Predicted frames ("P-frames") contain only the changes in the pixel values from the previous frame, and therefore P-frames use data from previous frames to decompress the P-frame. As a result, P-frames are more compressible than I-frames. Bi-predictive frames ("B-frames") can be decoded using both previous and forward frames for data reference. As set forth above, frequent transmission of I-frames can cause network congestion and/or jitter because of their increased size (e.g., the number of bits of data comprising the I-frame) relative to the P-frames and B-frames.

An encoding approach can encode a frame as an inter-coded frame such as P-frame or B-frame, or encode a picture as an intra-coded picture, such as a P-picture or a B-picture. Regions other than a frame or field can be defined and utilized for encoding as well. For example, an encoding approach can utilize a slice representing a defined region of a frame or picture that is encoded separately from any other region.

Just because a frame is intra-coded and does not reference the contents of another frame, that does not necessarily mean that it does not depend on a decoder having been set up with a particular state. Thus, just because a frame is intra-coded, that does not mean that receiving that frame is enough to allow decoding from that point. A key frame is a frame that is configured to act as a decoder refresh and allow decoding to proceed from that frame.

For example, in H.264 an instantaneous decoder refresh frame (IDR-frame) is a special intra-coded frame (an I-frame) that acts as a key frame. Conventionally, the IDR-frame causes all reference pictures in a decoded picture buffer (DPB) to be flushed, so that no subsequent video frames can reference any picture prior to the IDR-frame. Conventionally, this means that segments defined by these IDR-frames are self-decodable and do not depend on or reference any pictures in previous segments. The segments may be characterized as a group of pictures (GoP). The GoP size may indicate a number of frames that may be encoded until the next IDR-frame is encoded. For example, if the GoP size is 50, an encoder device may encode an I-frame followed by 49 inter-coded frames which may reference the I-frame. Conventionally, the $51^{st}$ frame would again be encoded as an I-frame at the start of the next GoP. In various examples, implementations of encoding and/or decoding techniques are described with respect to "frames" of image data (e.g., inter-coded frames, frame numbers, etc.). However, it should be noted that such example techniques involving frames could similarly be applied in the context of pictures (e.g. inter-coded pictures, picture numbers, etc.), slices, and other portions.

FIG. 1A is a diagram illustrating an example system 100 for continuous video recording, storage, and on-demand event streaming, in accordance with various aspects of the present disclosure. In various examples, the system 100 may include a camera device 120 configured in communication with one or more remote computing device(s) 102, and/or one or more non-transitory computer-readable memories 103. In various examples, the computing device(s) 102 may be configured in communication over a network 104. Although depicted as separate components in FIG. 1A, the computing device(s) 102 may be part of the camera device 120. In some examples, the computing device(s) 102 may be implemented in one or more chips of camera device 120. For example, one or more of the techniques used by the computing device(s) 102 may be performed using an application specific integrated circuit (ASIC) and/or using a field programmable gate array (FPGA). In some other examples, various techniques described herein may be instantiated in software executed by one or more processors of the camera device 120, computing device(s) 102 and/or some combination thereof.

Network 104 may be a communication network such as a local area network (LAN), a wide area network (such as the Internet), or some combination thereof. The one or more computing devices implementing the motion detector 502 may communicate with non-transitory computer-readable memory 103 (e.g., either locally or over network 104). The non-transitory computer-readable memories 103 may store instructions that may be effective to perform one or more of the various techniques described herein.

Camera device 120 may be configured to operate in a continuous video recording mode or non-continuous video recording mode. For example, a companion application to the camera device 120 (e.g., executing on mobile device 110) may be used to configure the camera device 120 to operate in continuous recording mode or motion-triggered (or event-triggered) recording mode. The camera device 120 may comprise a hardware and/or software based encoder 132 configured to encode video for transmission and/or storage. In the example depicted in FIG. 1A, the encoder 132 may encode video captured by camera device 120 as video chunks (using any desired video encoding technology, such as H264/H265, AV1, VP9, etc.). Each video chunk may represent a portion of video data. In some examples, the chunks may be a predetermined time length of video (e.g., 120 seconds or any other desired time length). In some examples, the chunks may be encoded to be within the predetermined time length (to within a tolerance (e.g., 5%, 10%, etc.). However, in some other examples, the chunks may be of a variable time length. For example, the chunks may be of a predetermined file size (e.g., to within a tolerance (e.g., 10%)).

The recorded video (e.g., video chunks 1, 2, . . . . N) may be sent by the camera device 120 to a storage service 150 that may be configured to store the video for later streaming or playback (e.g., via a companion application executing on mobile device 110). As shown in FIG. 1A, the video chunks may be stored as time-coded video chunks 152, where each chunk may be associated with a start time (e.g., time stamp data indicating a start time for the chunk) and an end time (e.g., a time stamp data indicating an end time for the chunk). The time stamps may be relative to a global clock and/or a clock of the camera device 120 or of the computing device(s) 102.

In various examples, the video data that is encoded by encoder 132 and sent to storage service 150 may not be stored with any data indicating video events (e.g., motion events, object detections, button presses on the camera device, initiation of live streaming events, etc.). Instead, the computing device(s) 102 may separately detect video events that may be associated with the recorded video stored by storage service 150, as described herein. For example, camera device 120 and/or the event detection manager 128 may detect various micro-events (at micro-event detection 130a and micro-event detection 130b, respectively). Micro-events may be various actions either detected in the video itself (e.g., motion events, human detections, action detections, etc.) or related to the video, camera device 120, and/or playback of video (e.g., a button press on the camera device 120, a start of live-video playback, a termination of live-video playback, etc.). One or more micro-events may make up a "video event." As used herein, a "video event" refers to a set of one or more micro-events (e.g., a predefined set of micro-events) that may be of interest to a user of the camera device 120.

For example, as described below in reference to FIG. 3, an "Answered Button Press" may be an example of a video event (e.g., a button press on a camera-enabled doorbell device) that may comprise the micro-events "Motion start" (e.g., a detection of motion by a motion sensor of the camera device 120), "Button Press" (e.g., a detection of a button press on the camera-enabled doorbell device), "Live View Start" (e.g., an initiation via a companion application of a live video stream from the camera-enabled doorbell device), and "Live View Stop" (e.g., a termination of the live video stream).

As shown in FIG. 1A, the micro-event detections (e.g., micro-event detections 130a, 130b) may occur on the camera device 120 and/or at an event detection manager 128 executed by computing device(s) 102. Various technologies may be used to determine the micro-events. For example, PIR-based motion sensors, radar-based motion sensors, and/or inter-frame motion evaluation (macroblock difference comparisons) may be used to detect a motion detection micro-event. Conversely, a data signal indicating a doorbell button press may be generated upon receiving the button press and may be sent to the event detection manager 128. In still other examples, computer vision techniques executed either on the camera device 120 and/or on the event detection manager 128 may be used to detect humans, objects, animals, actions, etc., where such detections may, in some cases, constitute micro-events. Once a particular micro-event is determined to potentially be a part of a video event that could be of interest (e.g., based on current user configuration settings), the micro-event may be deemed as "verified" and may be sent, as a topic-specific message on an EDA, to the video event detection 134.

Video event detection 134 may subscribe via the EDA to the various topics and may read from the partition files generated by the EDA (as described in further detail below). Video event detection 134 may analyze detected micro-events to determine whether the detected micro-events implicate a video event. Video event detection 134 may be implemented in various ways. For example, in some cases, video events may be pre-defined as including a certain set of micro-events. Accordingly, if the set of micro-events has occurred (e.g., within a certain amount of time), the video event detection 134 may determine that the pre-defined video event has occurred. For example, a "person detection" video event may include the micro-event "Motion detected" followed by the micro-event "human detected." Accordingly, if video event detection 134 detects these two micro-events within a certain time threshold (e.g., within 1 minute of one another), the video event detection 134 may detect the "Person Detection" video event and may generate the time stamp data corresponding to this video event. In some examples, certain micro-events (e.g., session end events) may trigger the video event detection 134 to analyze the set of detected micro-events to determine if the most recent micro-events (e.g., those within a pre-defined time threshold prior to the session end event) correspond to a pre-defined video event. In other examples, a machine learning model may take data representing detected micro-events as input and may predict whether any video events are implicated by these micro-event detections. For example, the machine learning model may be trained in a supervised fashion using training instances comprising a set of micro-events and a corresponding video event label (including null labels for sets of micro-events that do not correspond to a true video event). In some examples, the companion application 110 may provide a tool to enable a user to define their own video events. In such instances, the micro-events making up a user-defined video event may be detected automatically using micro-event detections 130a, 130b or may be manually defined by the user.

Although not shown in FIG. 1A, upon detection of a video event, data representing the detection of the video event may be sent by event detection manager 128 to a companion application of the camera device 120. The data may indicate that a video event has been detected and may include other information such as a thumbnail representing the video event, a name of the video event, a time at which the video event was detected, etc. A list of detected video events may be displayed in the companion application (e.g., executing on mobile device 110). However, in at least some examples, until a user selects a video event for playback through the companion application, the video representing the video event may not yet be available on the companion application.

Instead, when a user selects a video event (e.g., by clicking on a particular thumbnail and/or name of a detected video event in the companion application), a request may be sent to the event detection manager 128 for the selected video event. Upon receipt of the request, the event detection manager 128 may send the timestamp data 140 associated with the event to a video file generation service 136. The timestamp data 140 may include a start time for the event (e.g., a time at which the first constituent micro-event of the video event was detected and/or a few seconds prior to the first constituent micro-event (pre-roll)) and an end time for the event (e.g., a time at which the last constituent micro-event (e.g., end_live_view_session) of the video event was detected and/or a few seconds after the last constituent micro-event was detected (to ensure that all actions of interest are represented by the video).

The video file generation service 136 may receive the timestamp data 140 and may query the storage service 150 using an API request comprising the timestamp data 140. However, in many cases, distributed storage systems may not be able to return portions of chunks of stored video. Accordingly, should the timestamp data 140 span multiple chunks and/or represent only a portion of a chunk, the API of the storage system may not support returning only the requested portion of video that corresponds exactly to the timestamp data 140. Instead, the storage service 150 may return any chunks implicated by the timestamp data 140. For example, if the start time of the timestamp data 140 is in the middle of chunk 1 and the end time of the timestamp data 140 is in the middle of chunk 3 (where chunks 1, 2, and 3 represent contiguous video segments), the storage service 150 may return chunks 1, 2, and 3 to the video file generation service 136 (as relevant chunks 154). Conversely, if the start time and the end time of the timestamp data 140 are both within chunk 2, the storage service 150 may return only chunk 2 as the relevant chunk 154.

However, the relevant chunk(s) 154 returned by the storage service 150 may include a significant portion of video that is not relevant to the requested video event and which may therefore be uninteresting to the user. This is because the chunks of video streamed to the storage service 150 for storage may not correspond, time-wise, to the events that occur within the video. Accordingly, the video file generation service 136 may identify the constituent frame of video corresponding to the start time of the timestamp data 140 (e.g., the start time of the requested vide event) and the constituent frame of video corresponding to the end time of the timestamp data 140 and may generate a video file (e.g., on-demand video file 170) corresponding to only this portion of the relevant chunk(s) 154. As described in further detail below, in some cases, the video frame corresponding to the start time of the timestamp data 140 may not be self-decodable. For instance, the video frame corresponding to the start time of the timestamp data 140 may be an inter-encoded frame representing differences between the current frame and one or more other frames (e.g., a P-frame or a B-frame). Accordingly, video file generation service 136 may select an intra-encoded frame (e.g., an I-frame or instantaneous decoder refresh (IDR) frame) that is just prior to the inter-encoded start time frame as the initial frame of the on-demand video file 170. In other examples, the video file generation service 136 may transcode an intra-encoded frame for the start-time position (e.g., by combining the image data from a previous I-frame and the data of the inter-encoded frame (e.g., a P-frame) corresponding to the start time of the video event).

The on-demand video file 170 may be sent to the mobile device 110 in response to selection by the user of the video event on the companion application and may be played back. Additionally, the user may scrub within the on-demand video file 170 to fast forward, pause, and/or rewind playback. In the architecture described in FIG. 1A, the video events (including micro-events) are separately detected and are not stored in association with the video data itself (e.g., the chunks stored in storage service 150). Indeed, concise video files that depict specific video events (e.g., on-demand video file 170) do not exist prior to selection by the user of the detected event in the companion application. This architecture simplifies continuous video recording and event detection and streaming by logically separating event detection from video recording.

Figure 1B:
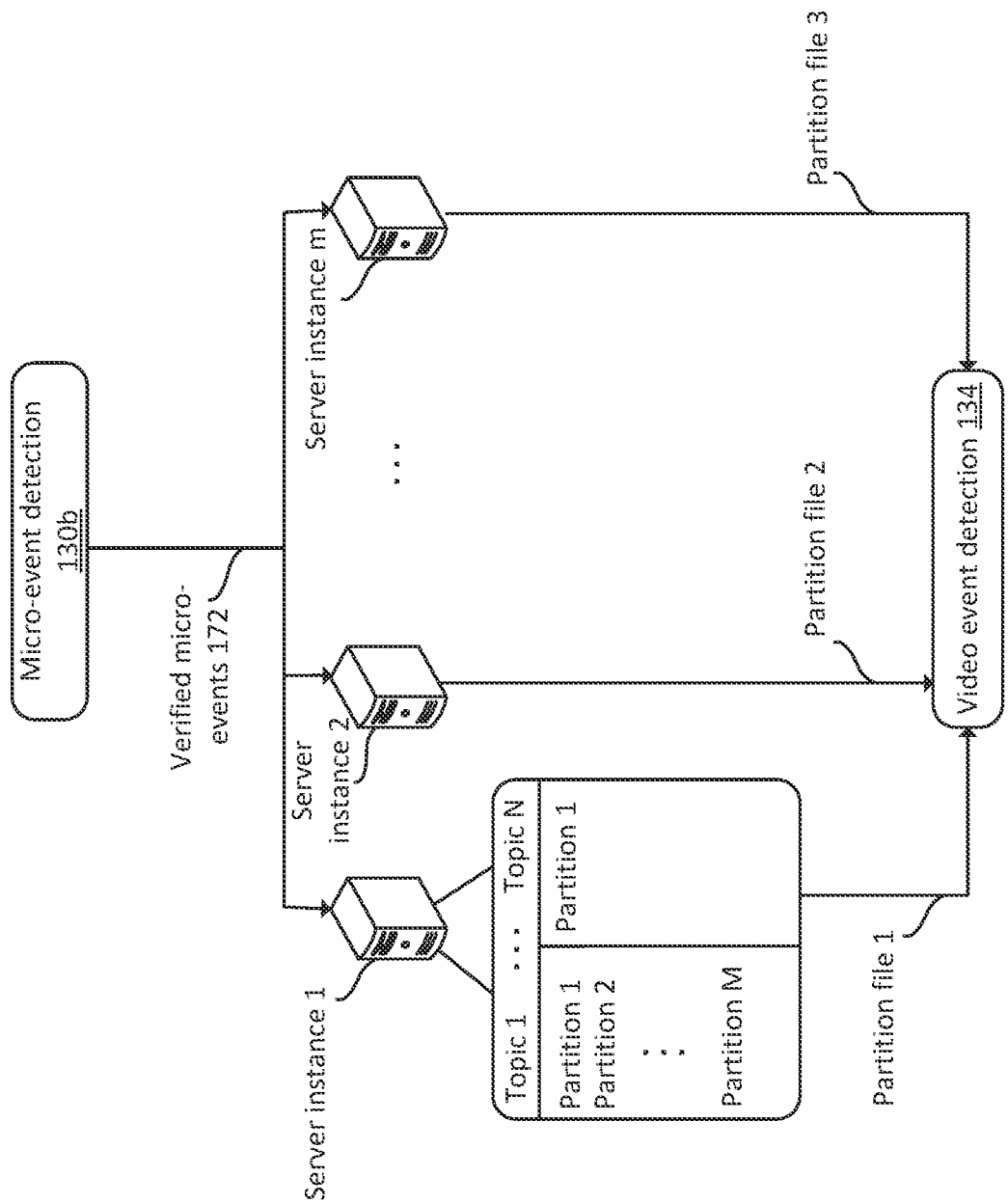
FIG. 1B depicts an example event streaming architecture using an asynchronous event driven messaging architecture, in accordance with various aspects of the present disclosure.

FIG. 1B depicts an example event streaming architecture using an asynchronous event driven messaging architecture, in accordance with various aspects of the present disclosure. Micro-event detection 130b may detect verified micro-events associated with different camera devices. Such verified micro-events may take a variety of forms, including button presses, initiation of streaming playback and/or live-streaming, human detection (by backend computer vision models), motion detection (by on-camera motion sensors and/or using back end computer vision models), etc. As there may be a large number of camera devices being supported by the service (e.g., millions of camera devices), there may be a large number of verified micro-events that are being processed and/or sent to video event detection 134 at a given time. In addition, the verified micro-event stream may be highly variable due to traffic fluctuations (e.g., event detection may be more common during daylight hours).

Different verified micro-events 172 detected and/or verified by micro-event detection 130b may be mapped to different topics in the EDA. Each topic may be separated into a variety of partitions, which may be files that can be read from by subscribers of those topics in the EDA. In the example depicted in FIG. 1B, video event detection 134 subscribes to partition file 1 (e.g., of Topic 1, partition file 2 (of some other Topic), and partition file 3. Accordingly, video event detection 134 may receive verified micro-event messages pertaining to these topics via the partition files 1, 2, and 3 and may analyze these micro-events to determine if a video event is detected and/or may send notification of video event detection to a companion application, as described in further detail below.

In general, the number of partitions assigned to a particular server instance may be correlated with the processing load on that server (although some partitions may have lower processing loads than others, depending on the types and volume of messages assigned to the partition). The number of server instances deployed for the event bus depicted in FIG. 1B may be variable. For example, when the CPU-utilization of all (or some percentage) of server instances 1, 2, . . . m exceeds some threshold CPU utilization, the compute service provider may scale out and add one or more additional server instances to the event bus. Since the verified micro-event traffic (e.g., verified micro-events 172) is highly variable, scaling the number of server instances assigned to the event bus may promote efficient compute utilization and may be used to satisfy latency and/or throughput constraints. However, as the number of server instances dynamically increases and decreases based on micro-event traffic volume, partitions assigned to these different server instances need to be rebalanced over time.

Rebalancing of partitions among server instances is described in further detail below in reference to FIGS. 4A, 4B.

Figure 2:
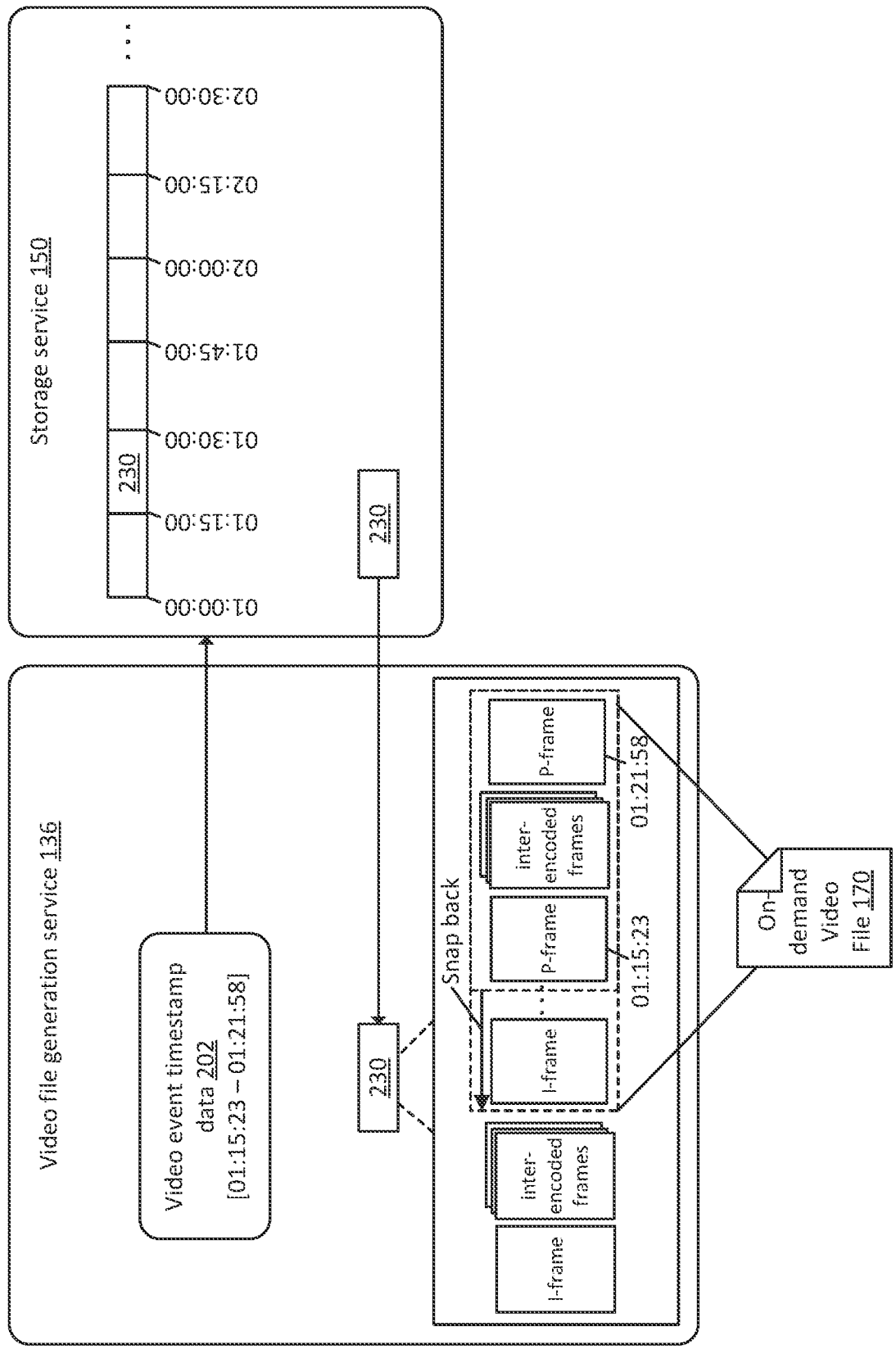
FIG. 2 depicts example retrieval and processing of video event data, in accordance with various aspects of the present disclosure.

FIG. 2 depicts example retrieval and processing of video event data, in accordance with various aspects of the present disclosure. In the example of FIG. 2, a user of the companion application of the camera device 120 may have selected a particular video event for playback. Accordingly, the event detection manager 128 may send the video event timestamp data 202 corresponding to the user-selected video event to the video file generation service 136. In the example, the video event timestamp data 202 has a start time of 01:15:23 and an end time of 01:21:58.

As shown in FIG. 2, the storage service stores a plurality of chunks of video data recorded by the camera device 120. The boundary between contiguous chunks may be defined by a time code representing a time at which one chunk ends and the next sequential chunk of the video begins. Video file generation service 136 may send the timestamp data 202 as part of a query of an API of storage service 150. Accordingly, the storage service 150 may process the request to determine the relevant chunk(s). In this example, chunk 230 corresponds to video between time code 01:15:00 and 01:30:00 (in the example of FIG. 2, each chunk represents a 15 minute segment of video). Since the video event timestamp data 202 has a start time of 01:15:23 and an end time of 01:21:58, the video event corresponds to chunk 230. Accordingly, chunk 230 may be returned to video file generation service 136 in response to the request. However, if the video file generation service 136 were to simply playback the entire chunk, the user would have to wait 23 seconds until the video event began occurring. This may lead to a frustrating user experience.

Accordingly, the video file generation service 136 may determine the frame of the chunk 230 that corresponds to the start time of the video event (e.g., 01:15:23). Depending on the frame rate and the granularity of the timestamp data, the start time may correspond to multiple frames. In the example depicted in FIG. 2, the start time of 01:15:23 corresponds to a P-frame. Since this is an example of an inter-encoded frame that is not self-decodable, the video file generation service 136 may select the I-frame (e.g., an intra-encoded frame that is self-decodable) that immediately precedes the P-frame that is associated with the video event start time. Accordingly, the video file generated by the video file generation service 136 to represent the user-selected video event may be "snapped back" to the closest I-frame preceding the P-frame at start time 01:15:23, as shown. In an alternate implementation, an I-frame may be transcoded at 01:15:23 using the preceding I-frame and the P-frame at 01:15:23 and used as the start of the on-demand video file 170. It should be noted that, while in FIG. 2 the chunk 230 appears to end at the P-frame at 01:21:58, the chunk 230 instead actually ends at 01:30:00. However, the chunk 230 may be trimmed so that the on-demand video file 170 generated by the video file generation service 136 only includes encoded frames up until the end time of 01:21:58.

The on-demand video file 170 may be generated in response to user selection of an event on the companion application to the camera device 120. After generation of the on-demand video file 170, the on-demand video file 170 may be sent to the companion application for playback so that the user may view video of the detected and user-selected video event.

Figure 3:
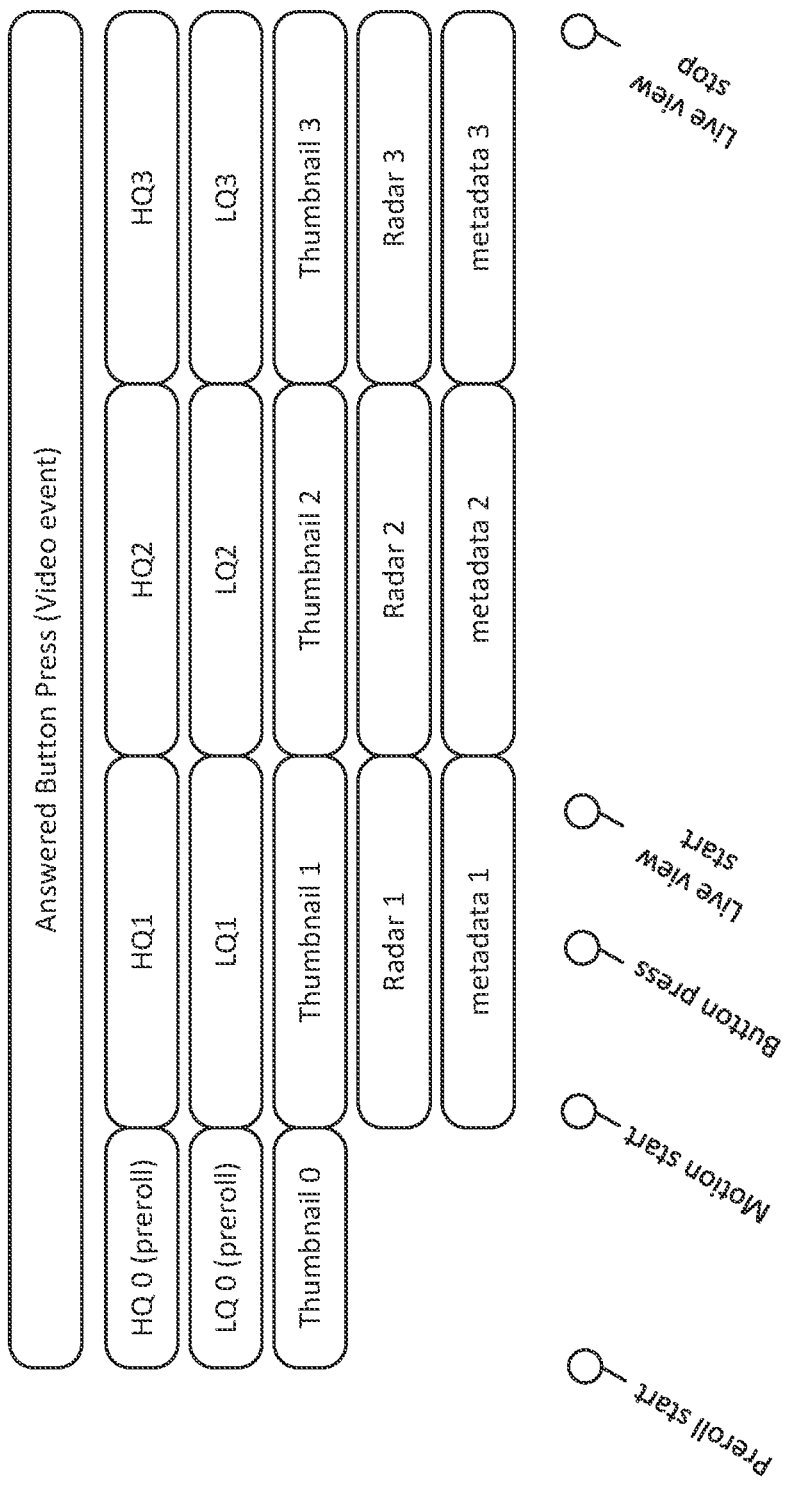
FIG. 3 depicts an example of video event detection using detected micro-events, in accordance with various aspects of the present disclosure.

FIG. 3 depicts an example of video event detection using detected micro-events (e.g., verified micro-events), in accordance with various aspects of the present disclosure. In the example of FIG. 3 HQ 0, HQ 1, HQ 2, HQ 3 represent high quality video chunks and LQ 0, LQ 1, LQ 2, LQ 3 represent corresponding low quality video chunks (e.g., in an adaptive streaming example where multiple streams having different bitrates and/or quality levels are stored).

Various detected micro-events are displayed at the bottom of FIG. 3, including "Motion start", "Button Press", "Live view start", and "Live view stop." As previously described, the video event detection 134 may subscribe to topics of an EDA related to these micro-events and may read data representing these verified micro-events from the relevant partition files. In the example of FIG. 3, the "live view stop" micro-event may trigger video event detection 134 to analyze the preceding detected micro-events to determine whether they correspond to a pre-defined set of micro-events associated with a pre-defined video event. In some examples, video events may be made up of two or more micro-events. However, a video event may be defined by a single micro-event, if desired. In some examples, two video events may overlap in time (with the set of micro-events for a first video event overlapping the set of micro-events for a second video event). Similarly, a given micro-event may be part of multiple video events. Each micro-event may be timestamped. Additionally, individual micro-events may be associated with time to live (TTL) values. In some examples, after the expiration of a TTL of a micro-event, the micro-event may no longer be considered for further video event detection. TTL values may be used to limit the amount of processing for detection of video events (by limiting the time window of micro-events that are considered as potentially pertaining to a particular video event).

In the example of FIG. 3, the set of micro-events (e.g., "Motion start", "Button Press", "Live view start", and "Live view stop") correspond to the video event "Answered Button Press." Accordingly, timestamp data may be generated corresponding to the video event "Answered Button Press." In the example, a timestamp that is prior to the "Motion start" micro-event may be selected to obtain some pre-roll prior to the start of motion. As shown, the micro-events do not necessarily correspond to the start of a given chunk of video (since video recording/storage and event detection may be logically separated, as previously described). For instance, the button press micro-event, which may be data representing a button press detection received from the camera device 120, is received in the middle of a video chunk (e.g., HQ1 and LQ1). In the example of FIG. 3, thumbnail blocks represent thumbnail generation for the corresponding video chunks. Similarly, the radar blocks represent radar-based motion sensor data generated for the corresponding video chunks and metadata blocks represent metadata generated for the corresponding video chunks (e.g., packet loss, bitrate, etc.). In various examples, a given chunk of video may commence with an I-frame. However, there may be one or more groups-of-pictures (GoPs) within a given chunk. Additionally, the GoP size may be dynamically adjusted during recording by camera device 120, as described in further detail below.

In FIG. 3, since video event detection 134 has detected the Answered Button Press video event, video event detection 134 may send data to the companion application indicating that the Answered Button Press video event has been detected. This data may include the timestamps of the Answered Button Press video event, one or more thumbnails related to the video event, the name of the video event, etc. For example, the video event may be displayed in the companion application (e.g., in a list of detected video events) as:

EVENT—Answered Doorbell Button Press—10:57 pm, Jan. 3, 2023 [Thumbnail]

The foregoing notification is merely an example. The particular notification and/or display of the detected video event in the companion application may vary depending on the desired implementation.

Other examples of micro-events may include detection that a streaming session has been initiated, detection that a source has connected (e.g., a camera device has connected to the streaming session), detection that a client has connected to the streaming session (e.g., a companion application executing on a mobile device), detection that a client has disconnected, detection that a client has answered a notification (e.g., the user has viewed the video or has otherwise responded to a notification), unverified motion (e.g., where motion is detected by one motion sensor, but is uncorroborated by another motion sensor or by computer vision), on-demand live view feed (e.g., a live video feed) initiated, a "knock" has been detected (e.g., via microphones), etc. It should be noted that the particular micro-events may be defined according to the desired implementation and the functionality, hardware, and/or capabilities of the camera device(s).

Figure 4A:
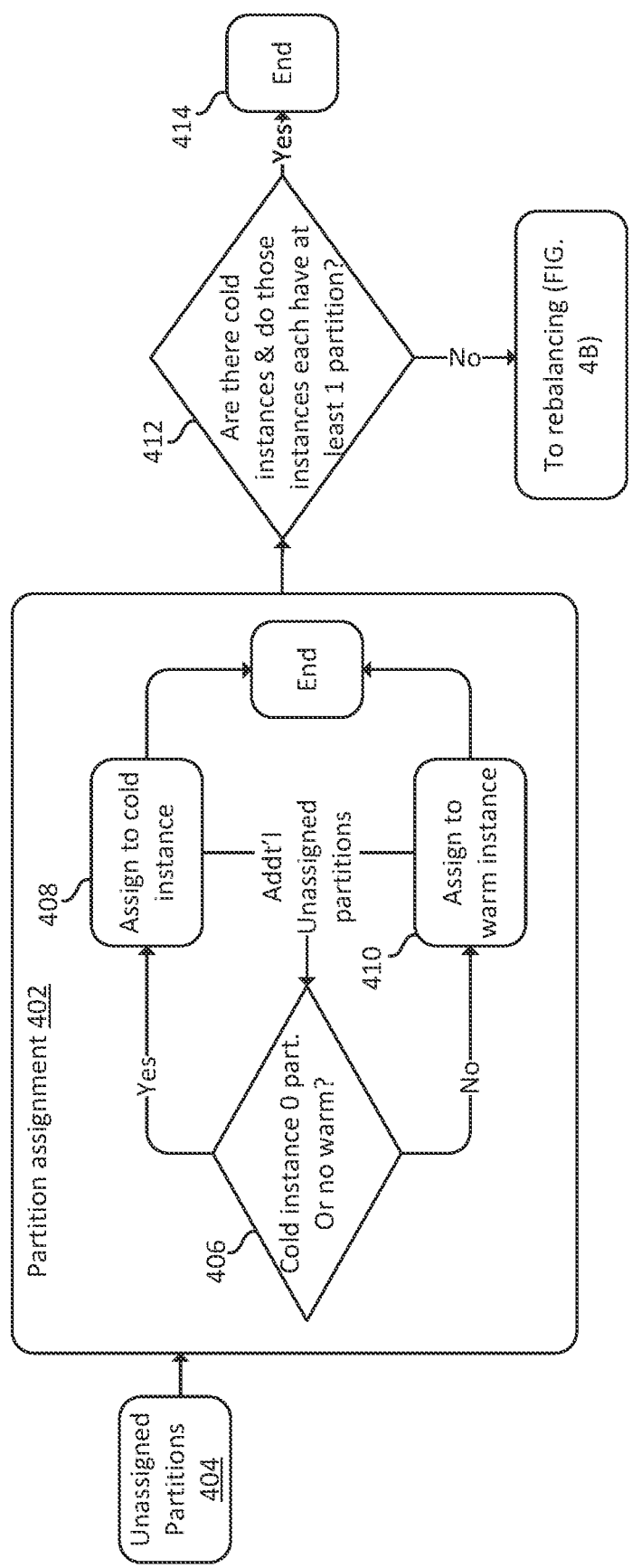
FIG. 4A depicts an example rebalancing architecture for video streaming event communication, in accordance with various aspects of the present disclosure.

FIG. 4A depicts an example rebalancing architecture for video streaming event communication, in accordance with various aspects of the present disclosure. At a given time, there may be some number of unassigned partitions 404 (e.g., for a particular topic of an EDA related to micro-events detected in video). The partitions may be unassigned for a variety of reasons. For example, unassigned partitions 404 may be unassigned due to rebalancing (as described below in reference to FIG. 4B), due to failure of a server instance, due to a newly-created partition, etc.

At decision 406 of partition assignment 402, it may be determined if there are any "cold" instances with no partitions assigned. A "cold" instance, in this context, refers to a server instance that currently has no assigned partitions (e.g., for the given topic) or which has been assigned partition during partition assignment 402, but which has not yet begun processing video micro-events for the recently-assigned partition. A server instance may be a cold instance due to the server instance being recently deployed (e.g., during scaling up by a cloud-compute service provider). If there are any cold instances with no assigned partitions, processing of partition assignment 402 may proceed to block 408, at which a single unassigned partition (of unassigned partitions 404) may be assigned to the cold instance. If there are additional unassigned partitions, partition assignment 402 may return to decision 406. If there are additional cold instances with no assigned partitions, a single unassigned partition may be assigned to each. However, if there are no more cold instances, but there are additional unassigned partitions 404, an unassigned partition may be assigned to a "warm" instance (block 410). A "warm" instance, in this context means that the server instance currently has at least one partition assigned (e.g., for the given topic) and is currently processing micro-events for that assigned partition. In an example, the unassigned partition may be assigned to the warm instance with the fewest number of assigned partitions (for the given topic) among all the warm instances. Once there are no more unassigned partitions, partition assignment 402 may end (end block).

After partition assignment 402 is ended, it may be determined (at decision 412) if there are any cold instances and, if so, if each of those cold instances has at least one assigned partition. If so, the algorithm may end (end block 414) as this indicates that all cold instances have been assigned at least one partition. Once these cold instances are "warmed up" (e.g., after configuration time and after they have begun processing messages) rebalancing (in FIG. 4B) may later be triggered to balance partition assignment among server instances. For example, rebalancing may be triggered after expiration of a threshold amount of time after configuration of the server instances. Conversely, if any cold instance has no assigned partitions, processing may continue to rebalancing partitions 420 in FIG. 4B.

Figure 4B:
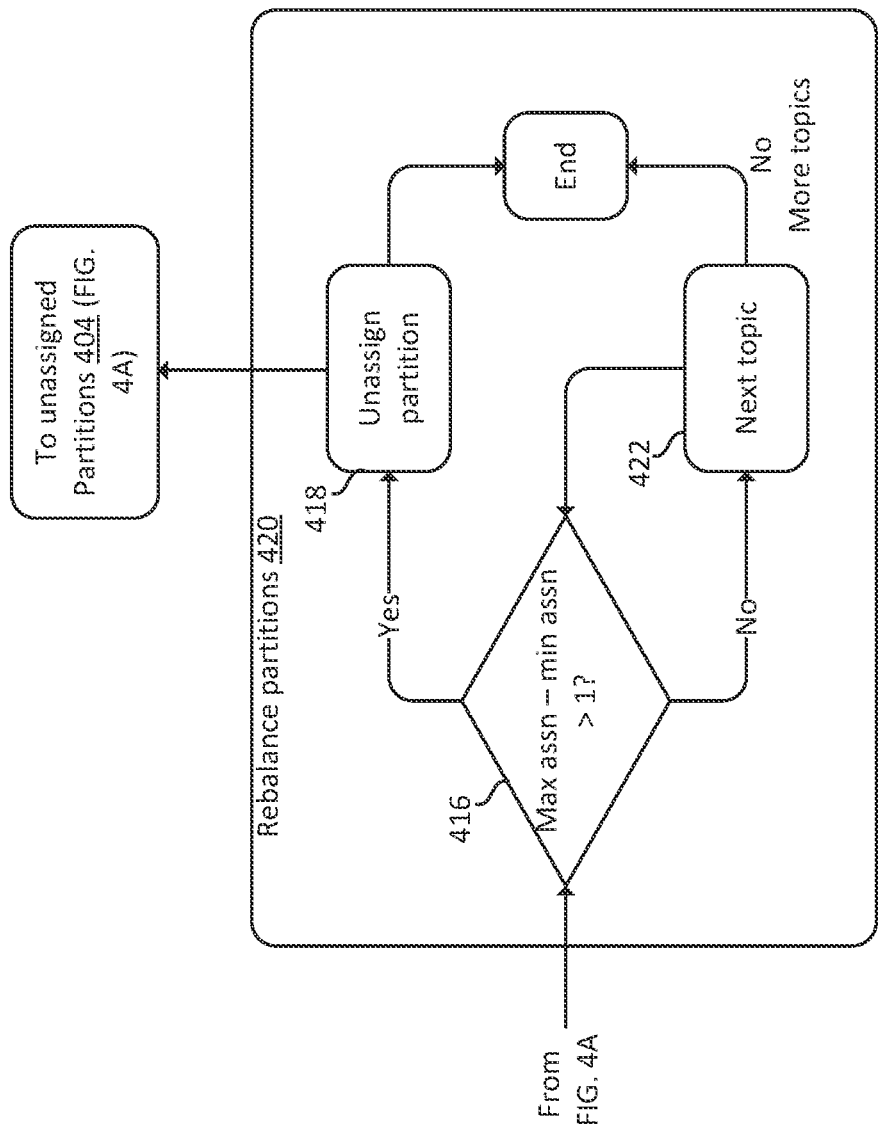
FIG. 4B depicts further detail regarding the example rebalancing architecture of FIG. 4A, in accordance with various aspects of the present disclosure.

FIG. 4B depicts further detail regarding the example rebalancing architecture of FIG. 4A, in accordance with various aspects of the present disclosure. Rebalance partitions 420 may commence at decision 416 at which a determination may be made of the server instance with the maximum number of assigned partitions and the server instance with the minimum number of assigned partitions (for a given topic). If the difference between the maximum number of assigned partitions and the minimum number of assigned partitions is greater than one, processing may proceed to block 418, at which a partition may be unassigned from the server instance with the maximum number of assigned partitions. This unassigned partitions becomes one of the unassigned partitions 404 from FIG. 4A and may be assigned according to partition assignment 402.

Conversely, if the difference between the maximum number of assigned partitions and the minimum number of assigned partitions is not greater than one, processing may proceed to block 422, where a next topic is considered. Processing may return to decision 416 and a determination may be made of the server instance with the maximum number of assigned partitions and the server instance with the minimum number of assigned partitions for the next topic. Rebalance partitions 420 may cycle through all topics and may unassign partitions as described above. Processing may then return to FIG. 4A and any unassigned partitions 404 may be assigned according to partition assignment 402.

Rather than unassigning a single partition at a time, as described herein, some EDA rebalancing schemes unassign and reassign multiple partitions at a time. However, this can result in increased latency of micro-event processing while multiple partitions are being reassigned. In some instances, server instances may be overwhelmed with new messages during multi-partition reassignment. The resulting latency can become so high that the video events become effectively useless to the user. Advantageously, unassigning a single partition at a time (rather than a typical EDA rebalancing scheme in which multiple partitions are unassigned and reassigned at a time) may lead to decreased latency in micro-event processing. In turn, this decreases latency in video event detection, processing, and video event notifications, which may be important and time-sensitive from a user's perspective. The partition assignment and rebalancing algorithm described in reference to FIGS. 4A, 4B may be a low-latency solution and may be used to satisfy service level agreements related to latency and/or service availability (e.g., uptime).

Figure 5:
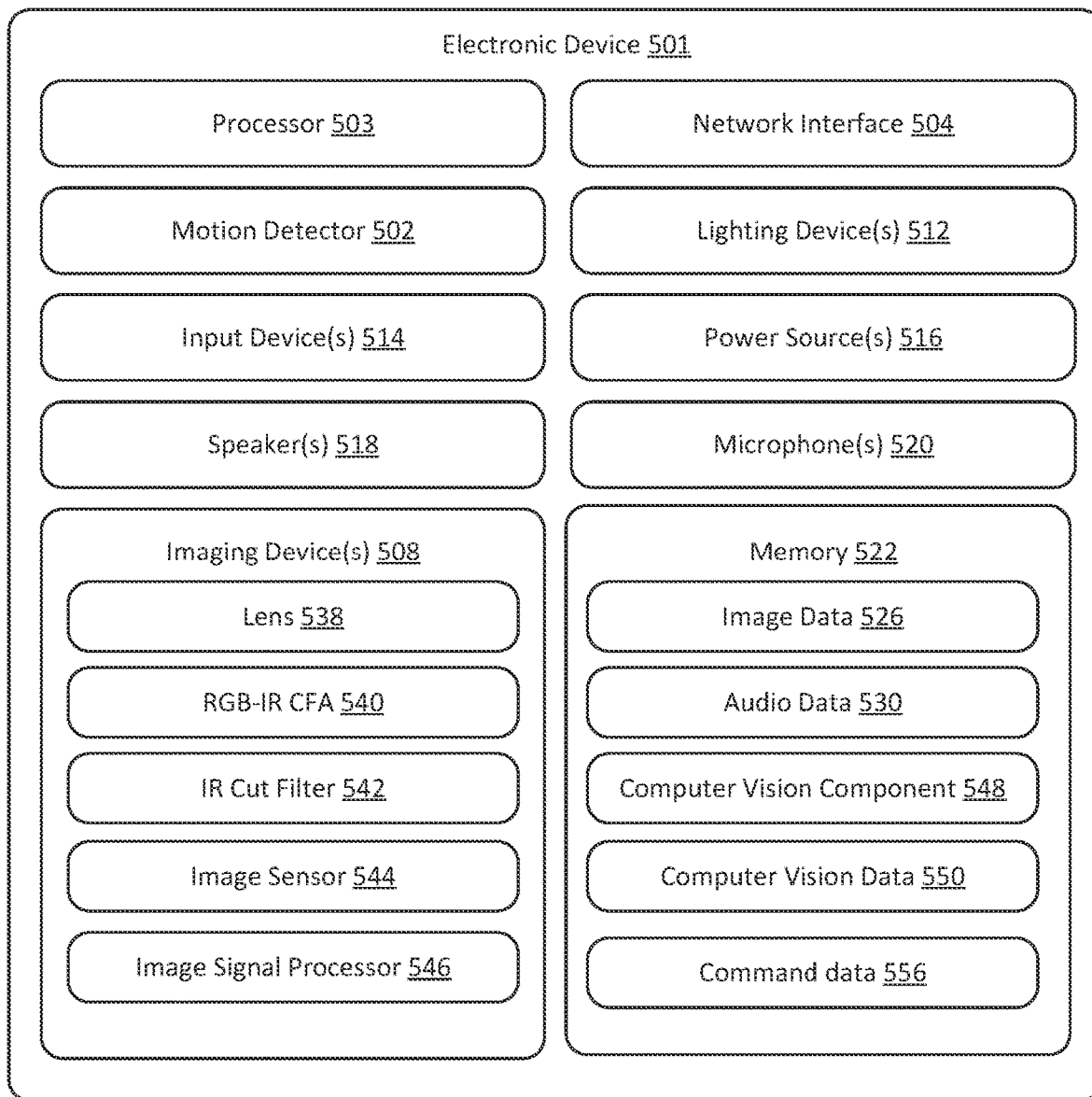
FIG. 5 depicts an example camera device, in accordance with various aspects of the present disclosure.

FIG. 5 depicts an example electronic device 501 that may implement, in whole or in part, camera device 120. As shown, the electronic device 501 may include one or more processors 503, one or more network interfaces 504, one or more motion detectors 502, one or more imaging devices 508, one or more lighting devices 512, one or more input devices 514, one or more power sources 516, one or more speakers 518, one or more microphones 520, and memory 522. In various examples, the electronic device 501 may be an example of a camera device, such as camera device 120 shown and described in reference to FIG. 1A.

As described herein, the motion detector 502 may include one or more (alone or in combination) different types of motion sensors. For example, in some embodiments, the motion detector 502 may comprise passive infrared (PIR) motion sensors, which may be secured on or within a PIR sensor holder that may reside behind a lens (e.g., a Fresnel lens). As previously described, the PIR sensors may detect IR radiation in a field of view, and produce an output signal (typically a voltage) that changes as the amount of IR radiation in the field of view changes. The amount of voltage in the output signal may be compared, by the processor(s) 503, for example, to one or more threshold voltage values to determine if the amount of voltage in the output signal is indicative of motion, and/or if the amount of voltage in the output signal is indicative of motion of an object that is to be captured by the imaging device(s) 508. In some examples, the processor(s) 503 may determine the distance based on the amount of voltage in the output signal. Additionally, or alternatively, in some examples, the processor(s) 503 may determine the distance based on which motion detector 502 detected the object.

Although the above discussion of the motion detector 502 primarily relates to PIR sensors, depending on the example, the motion detector 502 may include additional and/or alternate sensor types that produce output signals including alternative data types. For example, and without limitation, the output signal may include an amount of voltage change based at least in part on the presence of infrared radiation in a field of view of an active infrared (AIR) sensor, the output signal may include phase shift data from a microwave-type radio frequency motion sensor, the output signal may include doppler shift data from an ultrasonic-type motion sensor, the output signal may include radio wave disturbance from a tomographic-type motion sensor, and/or the output signal may include other data types for other sensor types that may be used as the motion detector 502. In at least some examples, the motion detector 502 may include a radar sensor and/or PIR sensor 130. A radar sensor may include a transmitter, two or more receivers (e.g., with corresponding antennas), a mixer, an ADC, and/or other electronics configured to perform the various operations described herein. In various examples, circuitry may be included in the electronic device 501 and/or in the image signal processor 546 that may be effective to perform the various motion detection techniques described herein. In various examples, a PIR sensor, radar sensor, or other motion sensor may be used to perform coarse motion detection (e.g., in first operation mode 140a). Once the PIR sensor or other motion sensor is triggered, other motion sensing techniques may be triggered (e.g., in second operation mode 140b).

An imaging device 508 may include any device that includes an image sensor 544, such as a charge-coupled device (CCD) and/or an active-pixel sensor (CMOS sensor), that is capable of generating image data 526 (which may represent, and/or include, the frames of image data described herein), representing one or more images (e.g., a video). The imaging device 508 may include a lens 538 that is effective to focus light on the image sensor 544. The light may be filtered by an RGB color filter array (CFA) 540 (e.g., a Bayer CFA) or an RGB-IR CFA. In one aspect of the present disclosure, the image sensor 544 may comprise a complementary metal-oxide semiconductor (CMOS) array and may be capable of recording high definition (e.g., 722p, 1800p, 4K, 8K, etc.) image and/or video files. The image sensor 544 may comprise a plurality of photosensors that may transform light into electrical signals. Such electrical signals may be represented by numerical values (e.g., floating point numbers) that may be processed using the image signal processor 546. Each photosensor of the image sensor 544 corresponds to a pixel in a frame of image data captured by the image sensor. In other words, the light information captured by the image sensor is represented as pixel values (e.g., a respective pixel value captured by each photosensor/pixel of the image sensor). Accordingly, each pixel in a frame of image data typically corresponds to one photosensor and the pixels in a frame are likewise arranged in a grid. The pixel value of each pixel represents the light captured by the corresponding photosensor during image capture.

In some other examples, the image sensor may be coated with a dual band-pass filter that has a passband at about 900 nm to allow IR color reproduction during the day and also to allow IR light detection when the imaging device(s) 508 are in night mode. In some examples, the electronic device 501 may include an IR cut filter 542 to filter out infrared light from the light path of the photosensors when the electronic device 501 is configured in day mode. The IR cut filter 542 may be removed from the light path such that infrared light may reach the photosensors when the electronic device 501 is configured in night mode.

The imaging device 508 may include a separate image signal processor 546, or the processor(s) 503 may perform the camera processing functionality. The processor(s) 503 (and/or camera processor) may include an encoding and compression chip. In some embodiments, the processor(s) 503 (and/or the camera processor) may comprise a bridge processor. The processor(s) 503 (and/or the camera processor) may process video recorded by the image sensor and may transform this data into a form suitable for transfer by the network interface(s) 504. In various examples, the imaging device 508 also includes memory, such as volatile memory that may be used when data is being buffered or encoded by the processor(s) 503 (and/or the camera processor). For example, in certain embodiments the camera memory may comprise synchronous dynamic random-access memory (SD RAM).

The lighting device(s) 512 may be one or more light-emitting diodes capable of producing visible light and/or infrared light when supplied with power (e.g., to enable night vision). In some embodiments, when activated, the lighting device(s) 512 illuminates a light pipe. In some examples, the electronic device 501 uses the lighting device(s) 512 to illuminate specific components of the electronic device 501, such as the input device(s) 514. This way, users are able to easily see the components when proximate to the electronic device 501.

An input device 514 may include, but is not limited to, a button, a touch-sensitive surface, a switch, a slider, and/or any other type of device that allows a user to provide input to the electronic device 501. For example, if the electronic device 501 includes a doorbell, then the input device 514 may include a doorbell button. In some examples, based on receiving an input, the processor(s) 503 may receive a signal from the input device 514 and use the signal to determine that the input device 514 received the input. Additionally, the processor(s) 503 may generate input data representing the input received by the input device(s) 514. For example, the input data may represent the type of input (e.g., a push to a button), a time that the input occurred, and/or the like.

The power source(s) 516 may include one or more batteries that provide power to the electronic device 501. However, in other examples, the electronic device 501 may not include the power source(s) 516. In such examples, the electronic device 501 may be powered using a source of external AC (alternating-current) power, such as a household AC power supply (alternatively referred to herein as "AC mains" or "wall power"). The AC power may have a voltage in the range of 112-220 VAC, for example. The incoming AC power may be received by an AC/DC adapter (not shown), which may convert the incoming AC power to DC (direct-current) and may step down the voltage from 112-220 VAC to a lower output voltage of about 12 VDC and an output current of about 2 A, for example. In various embodiments, the output of the AC/DC adapter is in a range from about 9 V to about 15 V and in a range from about 0.5 A to about 5 A. These voltages and currents are examples provided for illustration and are not intended to be limiting. In some examples, the power source(s) 516 may include one or more solar photovoltaic cells for generating electrical energy from sunlight.

The speaker(s) 518 may be any electromechanical device capable of producing sound in response to an electrical signal input. The microphone(s) 520 may be an acoustic-to-electric transducer or sensor capable of converting sound waves into audio data 530 representing the sound. The speaker(s) 518 and/or microphone(s) 520 may be coupled to an audio CODEC to enable digital audio received by user devices to be decompressed and output by the speaker(s) 518 and/or to enable audio data captured by the microphone(s) 520 to be compressed into digital audio data 530. In some examples, the electronic device 501 includes the speaker(s) 518 and/or the microphone(s) 520 so that the user associated with the electronic device 501 can communicate with one or more other users located proximate to the electronic device 501. For example, the microphone(s) 520 may be used to generate audio data representing the speech of the one or more other users, which is then sent to the camera device. Additionally, the speaker(s) 518 may be configured to output user speech of the user, where the user's user speech may also be represented by audio data 530.

In some examples, the electronic device 501 determines that the start of the video is the first frame of the video. In some examples, the electronic device 501 may continuously generate image data (e.g., the electronic device 501 does not turn off the imaging device(s) 508). In other examples, such as when the electronic device 501 does not continuously generate the image data 526 (e.g., the electronic device 501 turns off the imaging device(s) 508 until detecting an event such as a motion event), the start of the video corresponds to the first frame of the video that is generated by the imaging device(s) 508.

As further illustrated in the example of FIG. 5, the electronic device 501 may include the computer-vision component 548. The computer-vision component 548 may be configured to analyze the image data 526 using one or more computer-vision techniques and output computer-vision data 550 based on the analysis. The computer-vision data 550 may represent information, such as the presence of an object represented by the image data 526, the type of object represented by the image data 526, locations of the object relative to the electronic device 501, a direction of movement of the object, a velocity of the object, and/or any other type of information. In various examples, an object detection may be an example of a type of micro-event and/or a video event. As described herein, the type of object may include, but is not limited to, a person, an animal (e.g., a dog, a cat, a bird, etc.), a car, a tree, a wall, and/or any other type of object. In some examples, the computer-vision data 550 may further represent a bounding box indicating the respective location of each object represented by the image data 526.

For example, the computer-vision component 548 may analyze the image data 526 using one or more computer-vision techniques such as, but not limited to, object detection technique(s), object tracking technique(s), semantic segmentation technique(s), instance segmentation technique(s), object co-segmentation techniques, and/or any other computer vision technique(s). Computer-vision analysis includes methods for acquiring, processing, analyzing, and understanding digital images, such as by extracting high-dimensional data from the real world in order to produce numerical or symbolic information. This information is then used to identify object(s) represented in the image, locations of the object(s), a respective velocity of each object, and/or the like.

For a first example of performing computer-vision analysis, the computer-vision component 548 may use image segmentation technique(s) that use the computer-vision analysis to locate objects and boundaries (e.g., lines, curves, etc.) in images. Image segmentation may further assign labels to the segments, where segments that include the same label also include the same characteristics. As described herein, the one or more image segmentation techniques may include, but are not limited to, clustering technique(s), compression-based technique(s), histogram-based technique(s), edge detection technique(s), dual clustering technique(s), multi-scale segmentation technique(s), and/or any other type of image segmentation technique that may be use to segment the frame(s) of the video. In various examples, computer vision component 548 may be used to evaluate cropped activity zones in which motion has been detected using the motion detection techniques described herein. In various examples, upon detecting an object of interest in the cropped activity zone, the electronic device may begin encoding and transmitting captured video to one or more remote devices.

Compression-based technique(s) attempts to find patterns in an image and any regularity in the image can then be compressed. The compression-based technique(s) describe each segment (e.g., portion) by its texture and boundary shape, where each component is modeled by a probability distribution function and its coding length. The goal of the compression-based technique(s) is to find the segmentation which produces the shortest coding length. This may be achieved by a simple agglomerative clustering method.

Histogram-based technique(s) compute a histogram from all of the pixels in the image, where the peaks and values in the histogram are used to locate the clusters (e.g., portions) in the image. In some instances, color and intensity can be used as the measure of the clusters. In some instances, the histogram-based technique(s) may recursively apply the histogram-seeking method to clusters in the image in order to divide the clusters into smaller clusters. This operation may be repeated until no more clusters are formed.

Edge detection technique(s) use region boundaries and edges that are closely related, since there is often a sharp adjustment in intensity at the region boundaries. As such, the edge detection technique(s) use the region boundaries to segment an image. In some instances, the edge detection technique(s) use image detectors to identify the region boundaries.

Dual clustering technique(s) uses a combination of three characteristics of an image: partition of the image based on histogram analysis is checked by high compactness of the clusters, and high gradients of their borders. The dual clustering technique(s) use two spaces, one space is a one-dimensional histogram of brightness and a second space is a dual three-dimensional space of the original image. The first space allows the dual clustering technique(s) to measure how compactly the brightness of the image is distributed by calculating a minimal clustering. The clustering technique(s) use the two spaces to identify objects within the image and segment the image using the objects.

For a second example of performing computer-vision analysis, the computer-vision component 548 may use object detection technique(s) that use computer-vision analysis to perform informative region selection, features extraction, and then classification of object(s) represented by the image data 526. Informative region selection may include selecting different portions (e.g., windows) of an image represented by the image data for analysis. Feature extraction may then include extracting visual features of the object(s) located within the portions of the image in order to provide a semantic and robust representation of the object(s). Finally, classification may include classifying the type(s) of object(s) based on the extracted features for the object(s). In some examples, the object detection technique(s) may include machine learning technique(s), such as a Viola-Jones object detection technique, a scale-invariant feature transform technique, a histogram of oriented gradients features technique, and/or the like. Additionally, and/or alternatively, in some examples, the object detection technique(s) may include deep learning approaches, such as region proposal technique(s) (e.g., CNN technique(s)), you only look once technique(s), deformable convolutional networks technique(s), ad/or the like.

The electronic device 501 may also store command data 556. In some circumstances, a user of the electronic device 501 may want to receive a live view from the electronic device 501. The command data 556 may represent an identifier associated with the electronic device 501, a command to generate the image data 526, a command to send the image data 526, and/or the like. In some examples, the electronic device 501 may then analyze the command data 556 and, based on the identifier, determine that the command data 556 is directed to the electronic device 501. For example, the electronic device 501 may match the identifier represented by the command data 556 to an identifier associated with, and stored by, the electronic device 501. Additionally, the electronic device 501 may cause the imaging device(s) 508 to begin generating the image data 526 (e.g., if the imaging device(s) 508 are not already generating the image data 526) and send the image data 526 to the one or more computing devices implementing the motion detector 502, the camera device, and/or another device.

As used herein, a processor may include multiple processors and/or a processor having multiple cores. Further, the processor(s) may comprise one or more cores of different types. For example, the processor(s) may include application processor units, graphic processing units, and so forth. In one instance, the processor(s) may comprise a microcontroller and/or a microprocessor. The processor(s) may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) may possess its own local memory, which also may store program components, program data, and/or one or more operating systems.

Memory may include volatile and nonvolatile memory, removable and non-removable media implemented in any method or technology for storage of information, such as computer-readable instructions, data structures, program component, or other data. The memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory may be implemented as computer-readable storage media ("CRSM"), which may be any available physical media accessible by the processor(s) to execute instructions stored on the memory. In one basic instance, CRSM may include random access memory ("RAM") and Flash memory. In other instances, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the memory, or the same functionality may alternatively be implemented in hardware, firmware, application specific integrated circuits, field programmable gate arrays, or as a system on a chip (SoC). In addition, while not illustrated, the memory may include at least one operating system (OS) component that is configured to manage hardware resource devices such as the network interface(s), the I/O devices of the respective apparatuses, and so forth, and provide various services to applications or components executing on the processor(s). Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Washington, USA; the Windows operating system from Microsoft Corporation of Redmond, Washington, USA; LynxOS as promulgated by Lynx Software Technologies, Inc. of San Jose, California; Operating System Embedded (Enea OSE) as promulgated by ENEA AB of Sweden; and so forth.

Network interface(s) may enable data to be communicated between electronic devices. The network interface(s) may include one or more network interface controllers (NICs) or other types of transceiver devices to send and receive messages over network(s). For instance, the network interface(s) may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, the network interface(s) may include a wide area network (WAN) component to enable message over a wide area network.

Figure 6:
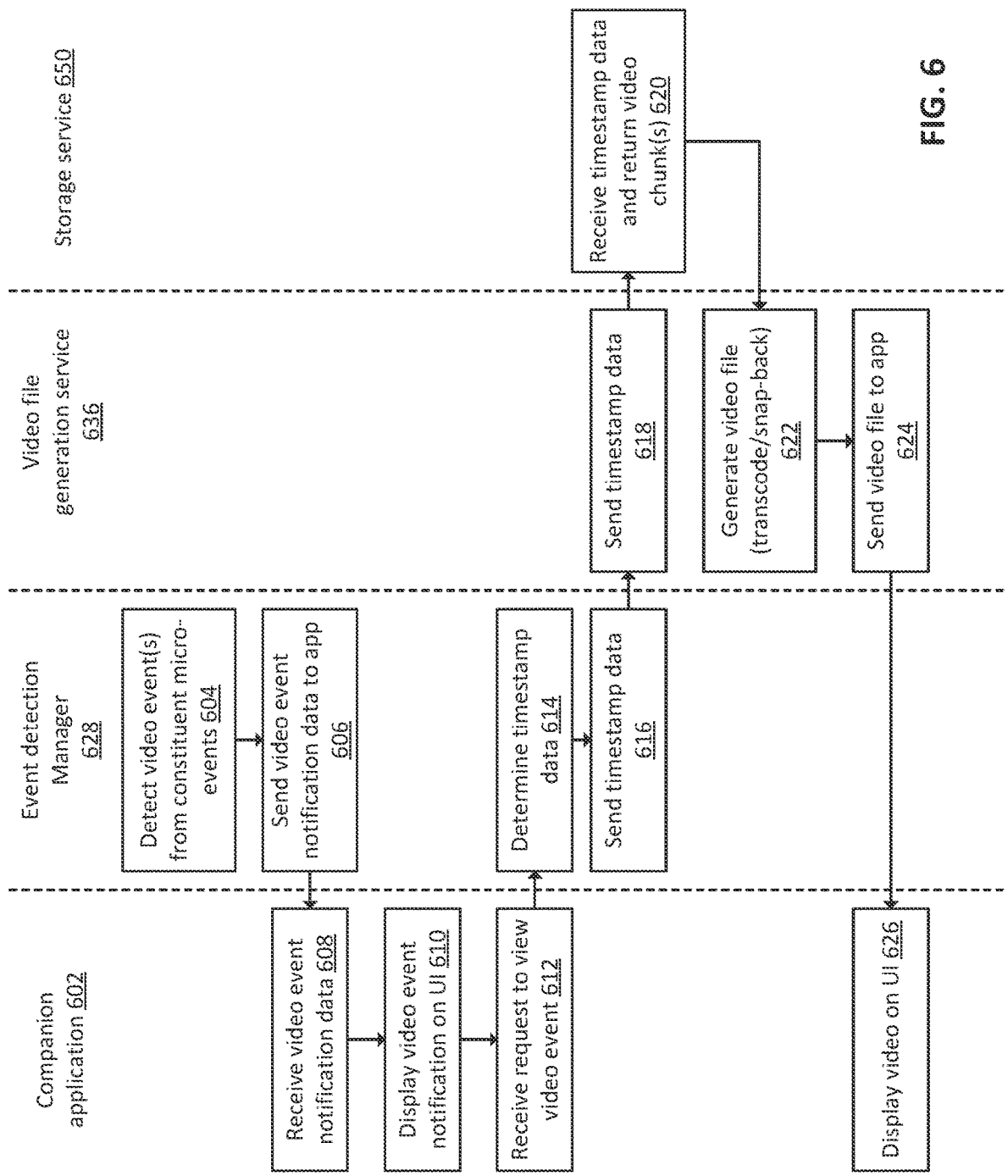
FIG. 6 depicts a timing diagram that may be used to provide on-demand video of a detected video event in a continuous recording architecture, in accordance with various aspects of the present disclosure.

FIG. 6 depicts a timing diagram that may be used to provide on-demand video of a detected video event in a continuous recording architecture, in accordance with various aspects of the present disclosure. The event detection manager 628 may detect video event(s) using the constituent micro-events (block 604). For example, the micro-events may be detected by the camera device 120 and sent to the event detection manager 628 or the micro-events may be detected from video data and/or other data sent to the event detection manager 628. In some examples, an end-session micro-event or other pre-defined micro-event may trigger the event detection manager 628 to evaluate the preceding micro-events to determine if a pre-defined video event is detected. If a video event is detected, the event detection manager 628 may send video event notification data to the companion application (block 606). At block 608, the companion application 602 may receive the video event notification data. At block 610, the companion application 602 may display the video event notification on a user interface. At block 612, a request to view the video event may be received on a user interface of the companion application 602.

At block 614, the event detection manager 628 may determine the timestamp data associated with the selected video event. The event detection manager 628 may send the timestamp data to the video file generation service 636 (block 616). Alternatively, the video file generation service 636 may already have the timestamp data for the selected video event and the selection of the video event may trigger the video file generation service to send the timestamp data to the storage service 650 (block 618). The storage service 650 may continuously receive chunks of video data for storage from the continuously-recording and streaming camera device 120. The storage service 650 may receive the timestamp data (e.g., via a API call) and may return the video chunk(s) implicated by the timestamp data (block 620). At block 622, the video file generation service 636 may generate a file including the frames of image data corresponding to the timestamp data received from the event detection manager 628. Additionally, the video file generation service 636 may include an I-frame that immediately precedes the start time of the timestamp data (to the extent the start time of the timestamp data does not already correspond to an I-frame of the video chunk). Alternatively, the video file generation service 636 may transcode an I-frame using the preceding I-frame of the video chunk and the inter-encoded frame implicated by the start time of the timestamp data. At block 624, the video file generation service 636 may send (e.g., stream) the video file to the companion application 602. At block 626, the companion application 602 may begin playback of the video file as it is received (e.g., using video streaming technology). Alternatively, the companion application 602 may download the video file prior to initiating playback.

Figure 7:
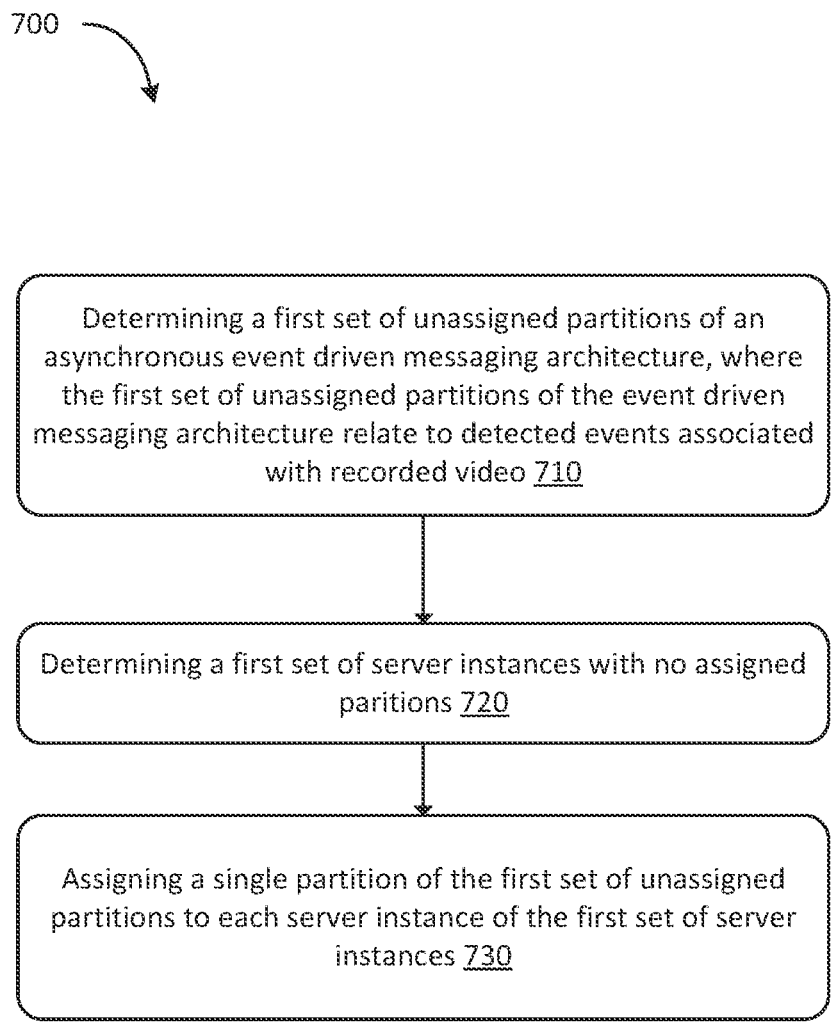
FIG. 7 depicts an example process for assigning unassigned partitions to server instances, in accordance with various aspects of the present disclosure.

FIG. 7 depicts an example process 700 for assigning unassigned partitions to server instances, in accordance with various aspects of the present disclosure. The actions of the process 700 may represent a series of instructions comprising computer readable machine code executable by a processing unit of computing device(s) 102, although various operations may be implemented in hardware. In various examples, the computer readable machine codes may be comprised of instructions selected from a native instruction set of the processor(s) and/or an operating system of the computing device.

Process 700 may begin at action 710, at which a first set of unassigned partitions of an asynchronous event-driven messaging architecture may be determined. In various event-driven messaging architectures, messages can be logically separated into topics. Topics are divided into partitions. As a distributed system, the event-driven messaging architecture (e.g., Apache Kafka) may run in a compute cluster. Each container in the cluster may be a message broker. Partitioning the messages of a topic enables messages to be split in parallel across several message brokers in the cluster. Partitioning takes the topic and divides the topic log into multiple logs, each of which can be stored on a separate node in the compute cluster. The first set of unassigned partitions may relate to various messages that are relevant to video events (e.g., verified micro-events that may be evaluated to determine if they correspond to one or more video events of interest).

Processing may continue at action 720, at which a first set of server instances with no assigned partitions may be determined. As previously described, server instances with no assigned partitions (and/or server instances that have recently been assigned partitions, but have not yet begun processing those partitions) may be referred to as "cold instances." The first set of server instances may be cold instances that have either recently been deployed (e.g., as a result of scaling by the cloud computing provider) and/or have not yet been assigned any partitions.

Processing may continue at action 730, at which a single partition may be assigned to each server instance of the first set of server instances. In various examples, unassigned partitions may be unassigned as a result of rebalancing (as described above in reference to FIG. 4B). As previously described, assigning a single partition at a time may avoid downtime and/or missed video event notifications since the number of unassigned partitions at any given time is limited.

As set forth above, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items may be stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be sent as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. The various features and processes described above may be used independently of one another, or may be combined in various ways. All possible combinations and subcombinations are intended to fall within the scope of this disclosure.

In addition, conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Although this disclosure has been described in terms of certain example embodiments and applications, other embodiments and applications that are apparent to those of ordinary skill in the art, including embodiments and applications that do not provide all of the benefits described herein, are also within the scope of this disclosure. The scope of the inventions is defined only by the claims, which are intended to be construed without reference to any definitions that may be explicitly or implicitly included in any incorporated-by-reference materials.

What is claimed is:

1. A method comprising:
   receiving a first message indicating a first event associated with video generated by a camera device;
   based on the receiving of the first message, storing, in a first partition associated with a first compute instance, first data indicating the first event associated with video generated by the camera device;
   determining that a first central processing unit (CPU) load value for the first compute instance exceeds a first threshold;
   based on the determining that the first CPU load value for the first compute instance exceeds the first threshold, initiating a second compute instance;
   determining that a difference between a first number of partitions assigned to the first compute instance and a second number of partitions assigned to the second compute instance is greater than one;
   based on the determining that the difference is greater than one, unassigning a single partition from the first compute instance, the single partition being the first partition; and
   assigning the first partition to the second compute instance.

2. The method of claim 1, wherein the method comprises receiving a second message indicating a second event associated with video generated by a camera device; based on the receiving of the second message, storing, in a second partition associated with the first compute instance, second data indicating the second event associated with video generated by the camera device;
   determining
      that the first CPU load value for the first compute instance exceeds the first threshold, and
      that a second CPU load value for the second compute instance exceeds the first threshold;
   based on the determining that the first CPU load value exceeds the first threshold and the determining that the second CPU load value exceeds the first threshold, initiating a third compute instance;
   determining that a second difference between a third number of partitions assigned to the first compute instance and a fourth number of partitions assigned to the third compute instance is greater than one;
   based on the determining that the second difference is greater than one, unassigning a single partition from the first compute instance, the single partition being the second partition; and
   assigning the second partition to the third compute instance.

3. The method of claim 1, wherein the method comprises determining that the first compute instance has failed; and
   based on the determining that the first compute instance has failed, unassigning a first set of partitions from the first compute instance;
   initiating a third compute instance;
   determining that the third compute instance has no assigned partitions;
   based on the determining that the third compute instance has no assigned partitions, assigning a single partition from the first set of partitions to the third compute instance;
   assigning a plurality of partitions from the first set of partitions to the second compute instance.

4. A method comprising:
   receiving a first message indicating a first event associated with video generated by a camera device;
   based on the receiving of the first message, storing, in a first partition associated with a first compute instance, first data indicating the first event associated with video generated by the camera device;
   determining that a difference between a first number of partitions assigned to the first compute instance and a second number of partitions assigned to a second compute instance is greater than one;
   based on the determining that the difference is greater than one, unassigning a single partition from the first compute instance;
   determining that the second partition has no assigned partitions;
   based on the determining that the second partition has no assigned partitions, assigning a single unassigned partition to the second compute instance.

5. The method of claim 4, wherein the method comprises sending, by the second compute instance, the first data indicating the first event to a system based on a subscription.

6. The method of claim 4, wherein the first partition is associated with a first topic.

7. The method of claim 4, wherein the method comprises determining, based on central processing unit (CPU) load information for the first compute instances, to utilize the second compute instance; and
   initiating, based on the determining to utilize the second compute instance, the second compute instance.

8. The method of claim 4, wherein the single partition is the first partition.

9. The method of claim 4, wherein the single unassigned partition is the first partition.

10. The method of claim 4, wherein the method comprises determining, based on central processing unit (CPU) load data for the first compute instance, to initiate use of the second compute instance.

11. The method of claim 4, wherein the method comprises determining, based on central processing unit (CPU) load data for a plurality of compute instances, to initiate use of the second compute instance.

12. A method comprising:
determining a first set of partitions of an asynchronous event driven messaging architecture that are not currently assigned to any server instance of a set of server instances, wherein the first set of partitions of the asynchronous event driven messaging architecture relate to detected events associated with recorded video;
determining, from the set of server instances, a first subset of server instances with no assigned partitions; and
assigning a single partition of the first set of partitions to each server instance of the first subset of server instances.

13. The method of claim 12, further comprising:
determining a first unassigned partition of the first set of partitions;
determining that there are no server instances without previously-assigned partitions; and
assigning the a first unassigned partition of the first set of partitions to a second server instance.

14. The method of claim 13, wherein the second server instance is selected for assignment of the first unassigned partition based at least in part on the second server instance having a minimum number of assigned partitions among the set of server instances.

15. The method of claim 12, further comprising:
determining, after assignment of the first set of partitions, a first server instance with no assigned partitions; and
executing a rebalancing of partitions based at least in part on the first server instance having no assigned partitions after assignment of the first set of partitions.

16. The method of claim 12, further comprising:
determining, after assignment of the first set of partitions, a first server instance with a maximum number of assigned partitions;
determining, after assignment of the first set of partitions, a second server instance with a minimum number of assigned partitions;
determining that a difference between the maximum number and the minimum number is greater than one; and
unassigning no more than a first partition from the first server instance based at least in part on the difference being greater than one.

17. The method of claim 16, further comprising:
determining, after unassigning no more than the first partition from the first server instance, that a second server instance has no assigned partitions; and
assigning the first partition to the second server instance.

18. The method of claim 12, further comprising:
determining a first plurality of topics of the asynchronous event driven messaging architecture;
determining, for each topic after assignment of the first set of partitions, a first server instance with a maximum number of assigned partitions;
determining, for each topic after assignment of the first set of partitions, a second server instance with a minimum number of assigned partitions;
determining, for each topic, a difference between the maximum number and the minimum number; and
for each topic:
unassigning no more than a first partition from the first server instance based at least in part on the difference being greater than one.

19. The method of claim 12, wherein data representing the detected events are correlated with recorded video data using timestamps, and wherein the data representing the detected events are stored separately from the recorded video data.

20. The method of claim 12, further comprising:
receiving, by an event detection manager, from a first partition of the asynchronous event driven messaging architecture, first message data indicating a first micro-event;
determining, by the event detection manager based at least in part on the first micro-event, a first video event, wherein the first video event comprises a plurality of micro-events including the first micro-event; and
sending notification data to a remote device, the notification data associated with the first video event.

* * * * *